United States Patent
Cohen

(10) Patent No.: US 7,669,614 B2
(45) Date of Patent: Mar. 2, 2010

(54) SYSTEMS AND METHODS FOR INSTALLATION INSPECTION IN PIPELINE REHABILITATION

(76) Inventor: Dan Cohen, 47 Rock Springs Rd., Breckenridge, CO (US) 80424

(*) Notice: Subject to any disclaimer, the term of this patent is extended or adjusted under 35 U.S.C. 154(b) by 149 days.

(21) Appl. No.: 11/842,937

(22) Filed: Aug. 21, 2007
(Under 37 CFR 1.47)

(65) Prior Publication Data
US 2009/0080980 A1    Mar. 26, 2009

Related U.S. Application Data

(60) Provisional application No. 60/823,085, filed on Aug. 21, 2006.

(51) Int. Cl.
*F16L 55/16* (2006.01)
(52) U.S. Cl. .................. 138/98; 138/97; 405/150.1; 405/184.2
(58) Field of Classification Search ............. 138/97, 138/98; 405/150.1, 184.2
See application file for complete search history.

(56) References Cited

U.S. PATENT DOCUMENTS

| | | |
|---|---|---|
| 4,401,133 A | 8/1983 | Lankston |
| 4,435,872 A | 3/1984 | Leikam |
| 4,950,446 A | 8/1990 | Kinumoto et al. |
| 4,985,196 A | 1/1991 | LeDoux et al. |
| 5,048,174 A | 9/1991 | McGuire |
| 5,186,757 A | 2/1993 | Abney |
| 5,346,658 A | 9/1994 | Gargiulo |
| 5,632,952 A | 5/1997 | Mandich |
| 5,725,328 A | 3/1998 | Schmager |
| 5,769,955 A | 6/1998 | Kozisek |
| 5,891,260 A | 4/1999 | Streets et al. |
| 6,089,275 A | 7/2000 | Steketee |
| 6,167,913 B1 | 1/2001 | Wood et al. |

(Continued)

FOREIGN PATENT DOCUMENTS

WO    2008/024798 A2    2/2008

(Continued)

OTHER PUBLICATIONS

International Search Report and Written Opinion for International Application No. PCT/US07/76453, mailed Jun. 10, 2008.

(Continued)

*Primary Examiner*—James F Hook
(74) *Attorney, Agent, or Firm*—Faegre & Benson, LLP

(57) ABSTRACT

A method for pipeline rehabilitation grout coverage inspection according to embodiments of the present invention includes installing a tubular liner within a pipeline by filling a space between the tubular liner and the pipeline with grout, creating a heat transfer across the tubular liner, and observing an inside of the tubular liner with an infrared camera to detect an infrared signal differential between areas of the tubular liner in contact with the grout and areas of the tubular liner not in contact with the grout. Observing and inspecting the inside of the tubular liner may be accomplished simultaneously with rounding of the liner and smoothing of the grout by harnessing an infrared camera to a swab and advancing the swab with chilled compressed air to cool the liner, according to embodiments of the present invention.

12 Claims, 19 Drawing Sheets

U.S. PATENT DOCUMENTS

| | | |
|---|---|---|
| 6,176,525 B1 | 1/2001 | McMillan et al. |
| 6,520,719 B1 | 2/2003 | Tweedie et al. |
| 6,523,574 B1 | 2/2003 | Taylor |
| 6,539,978 B1 | 4/2003 | McGuire |
| 6,551,028 B2 | 4/2003 | Robinson |
| 7,025,580 B2 | 4/2006 | Heagy et al. |
| 2005/0115338 A1 | 6/2005 | McGrew et al. |
| 2008/0178403 A1 | 7/2008 | Bryant et al. |
| 2008/0178955 A1 | 7/2008 | Bryant et al. |
| 2008/0213047 A1 | 9/2008 | Bryant et al. |

FOREIGN PATENT DOCUMENTS

| | | |
|---|---|---|
| WO | 2008/024799 A2 | 2/2008 |
| WO | 2008/024800 A2 | 2/2008 |
| WO | 2008/066981 A2 | 6/2008 |

OTHER PUBLICATIONS

International Search Report and Written Opinion for International Application No. PCT/US07/76451, mailed Jun. 4, 2008.
International Search Report and Written Opinion for International Application No. PCT/US07/76454, mailed Aug. 27, 2008.
International Search Report and Written Opinion for International Application No. PCT/US07/76455, mailed Jul. 15, 2008.

SYSTEMS AND METHODS FOR INSTALLATION INSPECTION IN PIPELINE REHABILITATION

CROSS-REFERENCE TO RELATED APPLICATION

This application claims the benefit of U.S. Provisional Patent Application Ser. No. 60/823,085, filed on Aug. 21, 2006, and entitled, "Systems and Methods for Pipeline Rehabilitation," which is incorporated herein by reference in its entirety for all purposes.

TECHNICAL FIELD

Embodiments of the present invention relate generally to rehabilitation of pipelines, and more specifically to inspection of grout coverage in pipeline rehabilitation.

BACKGROUND

After time, pipelines often suffer from corrosion of the inner diameter and/or minor cracking and/or leakage. Such pipelines must often be replaced or rehabilitated. Replacement often involves the movement or destruction of above-ground structures, such as roadways or sidewalks. Rehabilitation, on the other hand, may permit a new inner diameter of the pipe to be created using the existing pipeline as an outer shell, which may eliminate the need to dig up large sections of existing pipeline and/or water mains, and which may involve significant cost savings over replacement.

One form of pipeline rehabilitation involves the installation of a tubular liner inside of a host pipe with hardenable cement mortar (formed from grout) between the tubular liner and the host pipe. However, this process may form gaps or deficiencies in grout coverage between the tubular liner and the host pipe which are not easily observable, particularly if a non-transparent tubular liner is used. In addition, initial inspection of grout coverage must often wait until after the cement mortar/grout has hardened and the pipe-end hardware can be removed; by this time, it is often too late to easily correct, repair, or re-install grout or liner if grout coverage deficiency is discovered.

SUMMARY

Embodiments of methods according to present invention include installing a tubular liner within a pipeline by filling a space between the tubular liner and the pipeline with grout, creating a heat transfer across the tubular liner, and observing an inside of the tubular liner with an infrared camera to detect an infrared signal differential between areas of the tubular liner in contact with the grout and areas of the tubular liner not in contact with the grout. The heat transfer across the tubular liner may be created by cooling and/or heating the inside of the tubular liner. Such embodiments of methods may further include mounting the infrared camera on a camera frame with two or more wheels, coupling the camera frame with a swab, advancing the swab through the tubular liner from the front end to the back end of the tubular liner to distribute the grout between the tubular liner and the pipeline, and observing the inside of the tubular liner with the infrared camera during advancing of the swab. The swab and camera combination may be advanced using compressed air, and in some cases the compresses air may be routed through a heat exchanger to reduce its temperature (e.g. to twenty-five to thirty degrees Fahrenheit below ambient air temperature).

Embodiments of the methods may further include mounting the infrared camera to a camera frame with two or more wheels, mounting a heating element to the camera frame, the heating element creating the heat transfer across the tubular liner. A visual camera may also be mounted to the camera frame, and used to observe the inside of the tubular liner for tears; in such cases, the heating element may also include a visual light source. This observation of the grout coverage may occur before the grout hardens.

Embodiments of systems for pipeline rehabilitation installation inspection according to the present invention include a tubular liner deployed along an inside of a pipeline, a swab configured to advance through the tubular liner to open the tubular liner and distribute grout between the tubular liner and the pipeline, a means for creating a heat transfer across the tubular liner, and an infrared camera coupled to the swab, the infrared camera configured to detect gaps in grout coverage by detecting an infrared signal differential between areas of the tubular liner in contact with the grout and areas of the tubular liner not in contact with the grout. Such embodiments of systems may further include a camera frame with two or more wheels, the infrared camera mounted to the camera frame, the infrared camera coupled to the swab by a coupling between the camera frame and the swab. The camera frame may be removably coupled to the swab, such that the camera frame can detach from the swab and propel itself within the tubular liner to conduct additional inspection.

Embodiments of methods for pipeline rehabilitation according to the present invention include installing a tubular liner within a pipeline and inserting grout between the tubular liner and the pipeline, mounting an infrared camera on a camera frame with two or more wheels, coupling the camera frame to a swab, routing compressed air through a heat exchanger to reduce a temperature of the compressed air, applying the compressed air into the tubular liner behind the swab to advance the swab and the camera frame through the tubular liner and to cool the tubular liner; and observing an inside of the tubular liner with the infrared camera to detect an infrared signal differential between areas of the tubular liner in contact with the grout and areas of the tubular liner not in contact with the grout. Coupling the camera frame to the swab may include swivelably coupling the camera frame to the swab, such that a rotation of the swab as the swab advances through the tubular liner does not overturn the camera frame. Observation of the inside of the tubular liner with the infrared camera may occur prior to hardening of the grout, so that the tubular liner may be uninstalled based on a detection of areas of the tubular liner not in contact with the grout.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
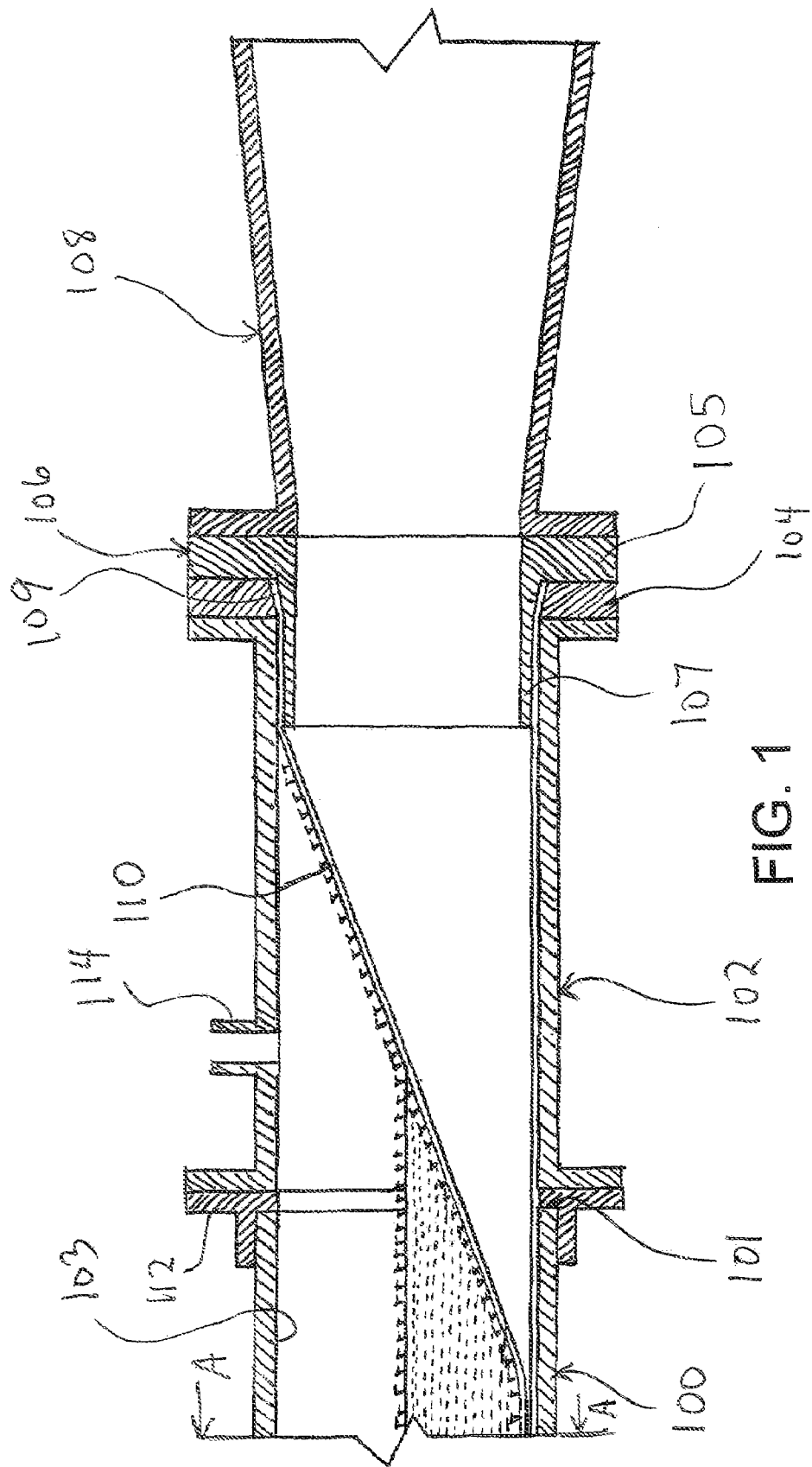
FIG. 1 illustrates a side cross sectional view of a front end system for pipe rehabilitation, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Embodiments of the present invention relate to improvements in the rehabilitation of fluid-bearing pipelines such as, for example, water mains. FIG. 1 illustrates a side cross sectional view of a front end system for pipe rehabilitation, according to embodiments of the present invention. According to embodiments of the present invention, a pipe 100 may be rehabilitated by inserting a liner 110 therethrough, and cementing the liner 100 to an inside diameter 103 of pipe 100 with grout. Liner 110 may be, for example, a liner with grout hooks as described in U.S. Pat. No. 6,167,913, issued on Jan. 2, 2001, and entitled "Pipe Liner, a Liner Product and Methods for Forming and Installing the Liner," which is incorporated by reference herein for all purposes. Liner 110 may be formed of an extruded medium-density polyethylene material or other polymer or polymer-like material; for example, liner 110 may be formed from a sheet of material created by Velcro® Europe S.A. According to some embodiments of the present invention, liner 110 conforms to ASTM-D1248: Type 11, Class B, Category 5 standards, and based upon ISO classifications, may be classified as PE-80 or PE-100 material. According to some embodiments of the present invention, liner 110 is substantially resistant to ultraviolet radiation and is designed for potable water applications.

According to some embodiments of the present invention, liner 110 has a tensile strength at breakage of approximately 30 Mpa, an elongation at breakage of approximately 1,100%, a flexural modulus of approximately 700 Mpa, a hardness of approximately 60 Shore D, a Vicat softening point of approximately 126° Celsius, a density at twenty-three degrees Celsius of approximately 942 kilograms per cubic meter, a weight of approximately 450 kilograms per square meter (plus or minus fifty grams per square meter), and a hook concentration of approximately twenty per square centimeter (plus or minus ten percent).

Figure 4:
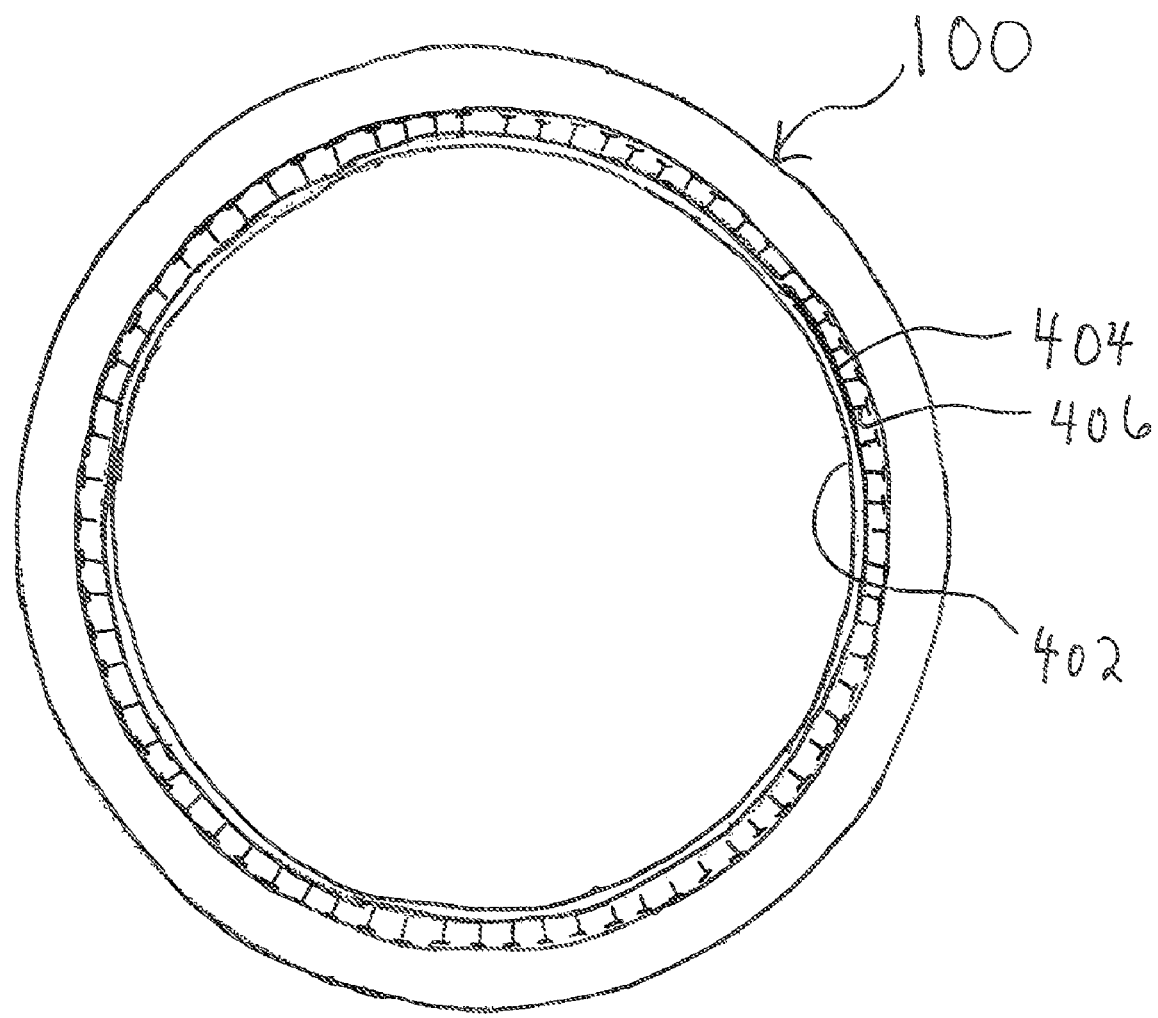
FIG. 4 illustrates a front cross sectional view of a pipe taken along line A-A of FIG. 1, depicting a pipe liner in a finished state after affixation of the liner to the pipe, according to embodiments of the present invention.

As shown in FIG. 4, the sheet of material may then be formed into a tube shape and welded to itself, to form a tube-shaped liner 110 with grout hooks 406 on an outer surface 404 and a smooth inner surface 402. The seam (not shown) created by welding the sheet of material into a tube shape may be located on the inner surface 402 or the outer surface 404; alternatively, the liner 110 may be formed and/or welded such that a seam neither protrudes from inner surface 402 nor from outer surface 404.

Pipe 100 has a front end 101 and a back end 502. Once liner 110 has been placed continuously through pipe 100 from front end 101 to back end 502, liner 110 may be attached to structures at each end to prevent the liner 110 from slipping back into pipe 100, and for stretching and/or tensioning liner 110 within pipe 100. For example, a liner clamp 106 may be used at each end 101, 502 to secure the liner 110. Liner clamp 106 may include a clamp base 105 having a tubular neck 107 over which liner 110 may be inserted, according to embodiments of the present invention. Once liner 110 has been inserted over tubular neck 107, cuff 104 may be placed over liner 110 and tubular neck 107 and bolted or otherwise connected with clamp base 105 to form a pressure fit with clamp base 105. Such a configuration squeezes liner 110 between base 105 and cuff 104; according to some embodiments of the present invention, tubular neck 107 may include an angled portion 109 configured to mate with a similarly-angled portion of cuff 104 to further emphasize the pressure fit between base 105 and cuff 104.

Various stages of liner 110 installation may involve the insertion and removal of objects and/or fluids into liner 110; liner clamp 106 may facilitate the insertion and/or removal of objects and/or fluids (e.g. air) from within liner 110, while minimizing the potential for tearing, crumpling, folding, or otherwise damaging the ends of liner 110. This quality is further enhanced by the presence of tubular neck 107 to ease insertion of objects into liner 110 near front end 101. Similarly, a liner clamp 106 may be used near back end 502 (see FIG. 5, for example).

Figure 22:
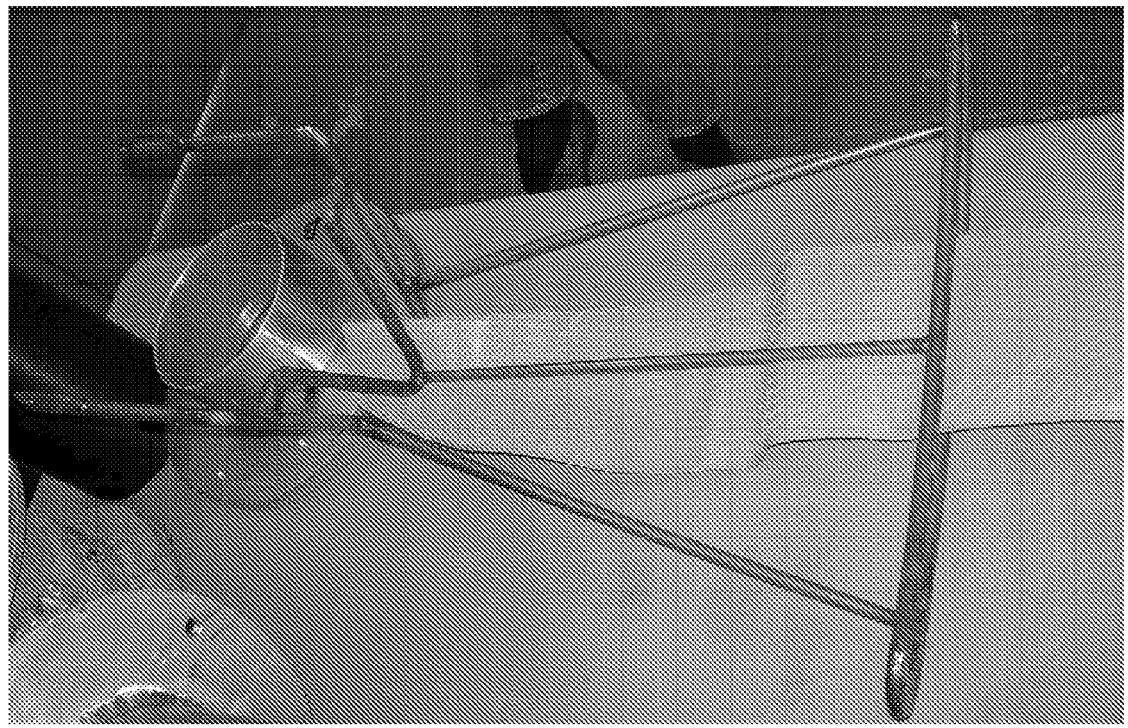
FIG. 22 illustrates a liner folder, according to embodiments of the present invention.
Figure 23:
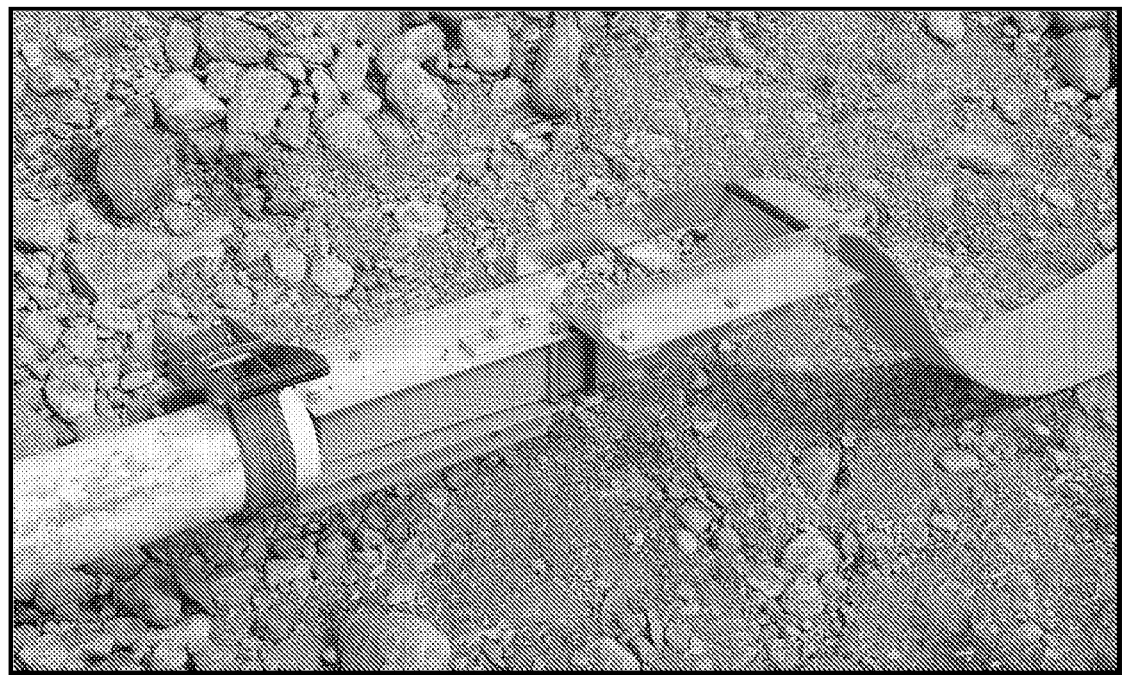
FIG. 23 illustrates an alternative liner folder, according to embodiments of the present invention.

According to some embodiments of the present invention, liner 110 may be folded flat and wound into a spool prior to deployment through pipe 100. Liner 110 is preferably deployed within pipe 100 in a fashion which minimizes twisting of liner 110 within pipe 100. One way in which twisting of liner 110 may be minimized during deployment through pipe 100 constitutes imparting a V-shape or bend longitudinally in liner 110 as it enters pipe 110. Such V-shape or longitudinal bend (see FIG. 3 for example) also encourages effective grout coverage of the top portions of the liner 110. Such a shape may be imparted to liner 110 as liner 110 is inserted into pipe 100 manually, by shaping the liner 110 with one's hands, or via use of a specially designed frame as depicted in FIGS. 22 and 23.

Figure 5:
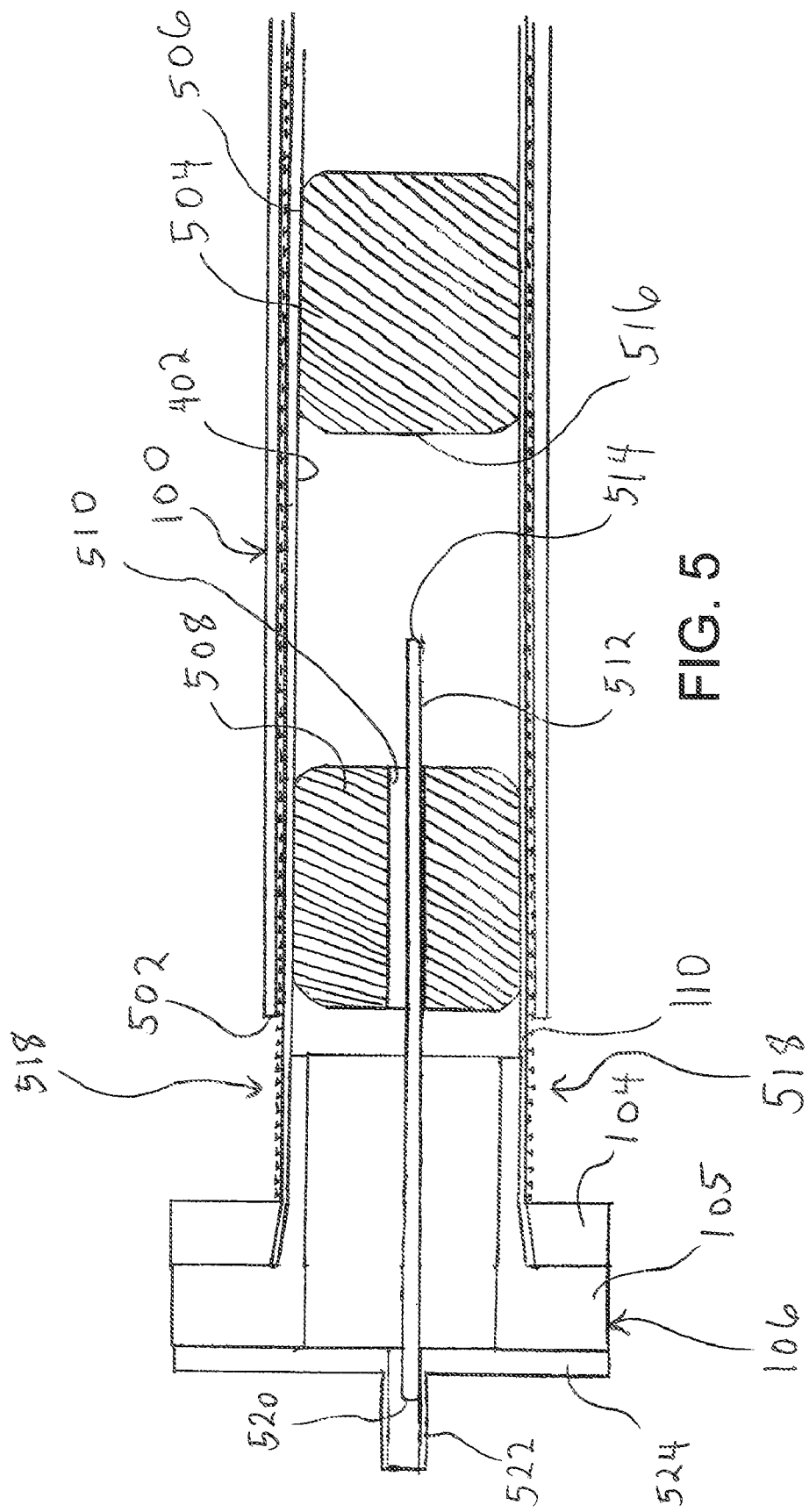
FIG. 5 illustrates a side cross sectional view of a back end system for pipe rehabilitation, according to embodiments of the present invention.
Figure 18:
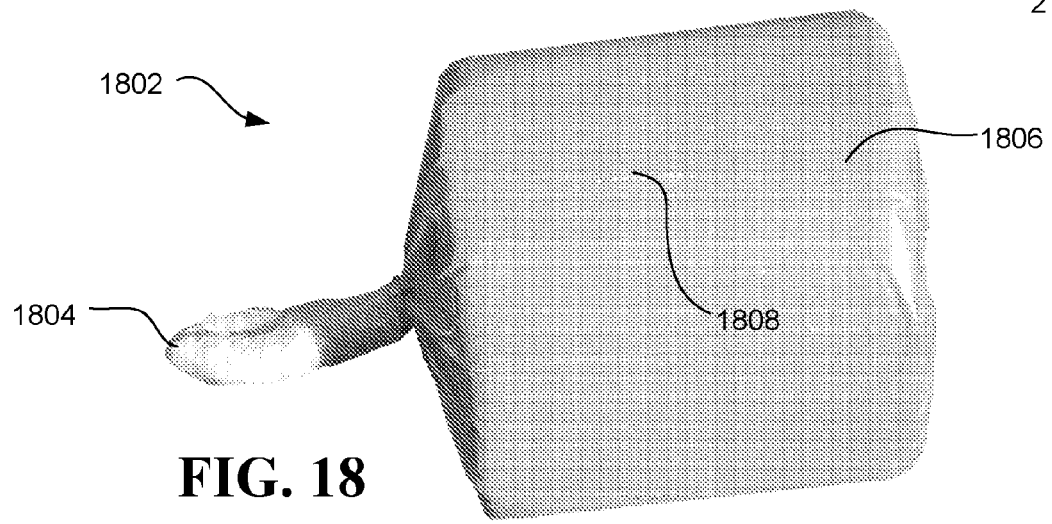
FIG. 18 illustrates a swab with a plastic wrapper, according to embodiments of the present invention.
Figure 19:
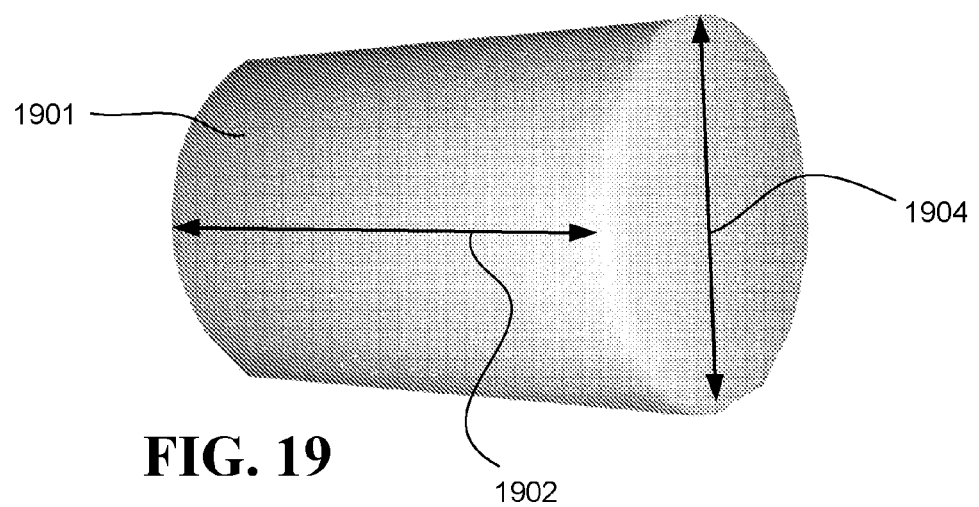
FIG. 19 illustrates a swab, according to embodiments of the present invention.

A swab 504 may be used for initial deployment and proper placement of liner 110. One example of a swab 504 is depicted in FIG. 5; other examples of swabs 1802, 1901 are depicted in FIGS. 18 and 19. According to embodiments of the present invention, swab 504 is a slightly deformable plug-type device which fills an inside diameter 103 of pipe 100 and/or inside diameter 402 of liner 110, thereby applying a radial force to such inside diameter 103 and/or 402. For example, swab 504 may be constructed with a stiff foam, and may be sized so as to fit within pipe 100 and/or liner 110 only upon contraction and/or compression of outer diameter 506 of swab 504. Swab 504 may be moved along pipe 100 and/or liner 110 by applying a force to one side of swab 504; such force may be applied, for example, by applying an air or water pressure to one side of swab 504, where swab 504 forms a substantially hermetic seal with inner diameter 103 and/or inner diameter 402.

Prior to initial deployment of liner 110 through pipe 100, a swab 504 may be run through pipe 100 from front end 101 to back end 502. This may be achieved by pumping compressed air into pipe 100 behind swab 504. This may accomplish two results: first, swab 504 can be configured to clean inner diameter 103 in preparation for the pipeline rehabilitation; second, swab 504 may be attached to a string, rope, cord, or cable which, once it extends the length of pipe 100, may be used to pull liner 110 from front end 101 to back end 502. In addition, once liner 110 has been initially deployed within length of pipe 100, swab 504 may be run through liner 110 in order to remove any debris from inside 402 of liner 110 and to straighten liner 110 within pipe and remove any twisting of liner 110 within pipe 100. A swab 504 may also be referred to as a "pig;" alternatively, a swab 504 may be used for initial deployment of a liner 110, while a pig 504 having a different configuration may be used for the later step of smoothing the liner 110 against the grout and against inside 103 of pipe 100.

Prior to attachment of liner 110 to liner clamp 106, a pipe interface flange 112 may be coupled to front end 101 of pipe 100. Pipe interface flange 112 may serve to protect front end 101 of pipe 100 and permit additional hardware to be attached to pipe 100. A grout injection manifold 102 may then be coupled to pipe 100 via interface flange 112. Grout injection manifold 102 permits grout to be injected through grout injection port 114 into the space between liner 110 and pipe 100 prior to smoothing of the liner 110 against pipe 100 by swab 504. Once grout injection manifold 102 has been coupled with interface flange 112, liner 110 may then be clamped between cuff 104 and base 105 of liner clamp 106, and liner clamp 106 may be coupled with grout injection manifold 102, as illustrated in FIG. 1 according to embodiments of the present invention.

As used herein, the term "coupled" is used in its broadest sense to refer to elements which are connected, attached, and/or engaged, either directly or integrally or indirectly via other elements, and either permanently, temporarily, or removably. For example, one way in which swab launcher 108 may be coupled to liner clamp 106 would be to place bolts through corresponding holes in a flange in swab launcher 108 and in liner clamp 106 and tighten the bolts. According to some embodiments, the bolts may be tightened until a hermetic or quasi-hermetic seal is formed. Such a hermetic seal may also be formed by inserting an O-ring between swab launcher 108 and liner clamp 106 prior to bolting them together. Based on the disclosure provided herein, one of ordinary skill in the art will recognize the various ways in which pipe-like elements may be coupled together to achieve the pipeline rehabilitation methods described herein.

Figure 2:
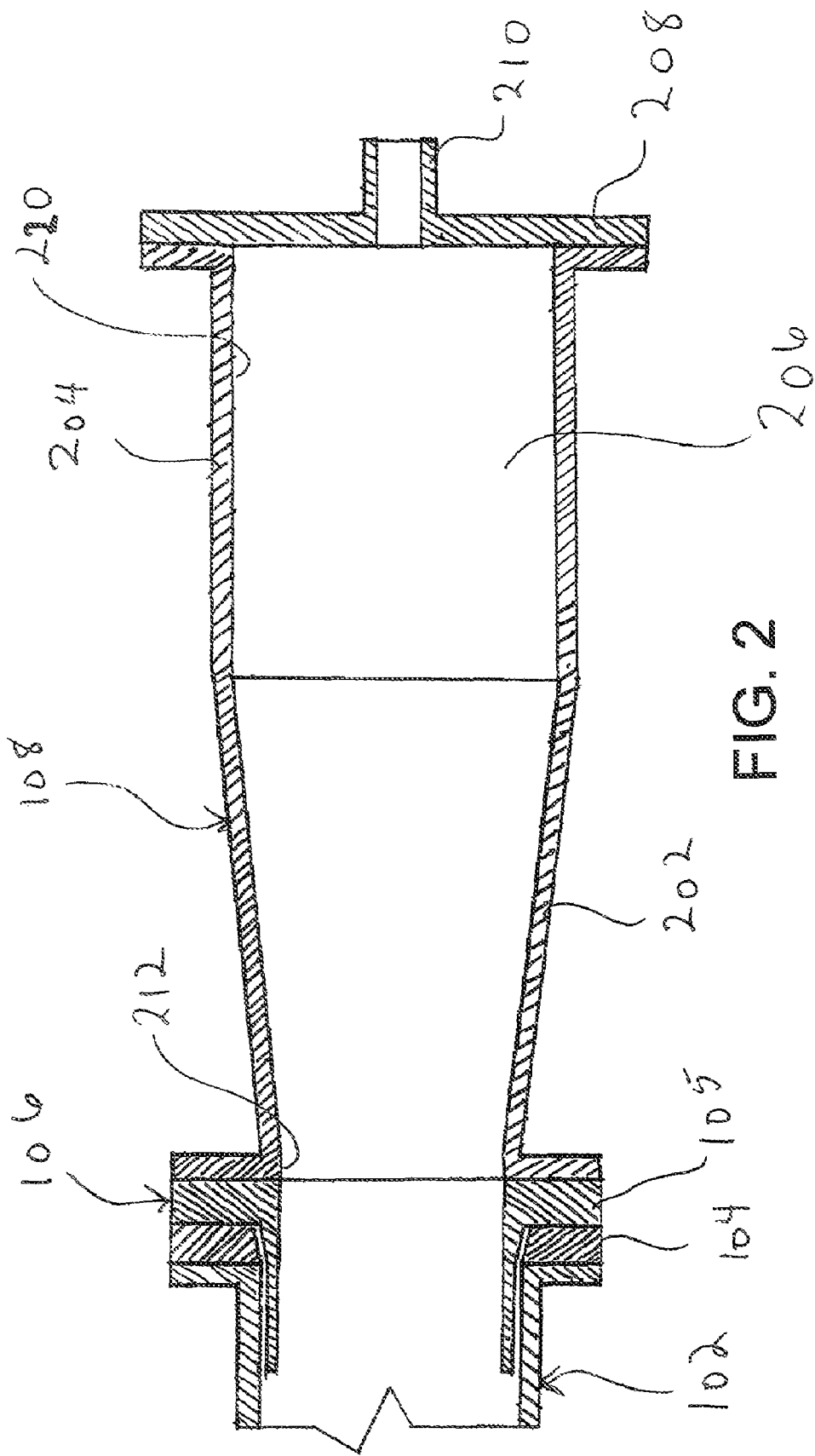
FIG. 2 illustrates a side cross sectional view of a front end system depicting a swab launcher according to embodiments of the present invention.

FIG. 2 illustrates a swab launcher 108 according to embodiments of the present invention. Swab launcher 108 may be coupled with liner clamp 106. Swab launcher 108 includes a narrowing portion 202 and a straight portion 204, the straight portion enclosing a launch chamber 206. Swab launcher 108 is configured to compress a swab 504 from an outer diameter 506 corresponding to inner diameter 220 of swab launcher 108, to an outer diameter 506 corresponding to inner diameter 212 near the back end of swab launcher 108. According to embodiments of the present invention, swab 504 may be placed into launch chamber 206, and an end plate 208 may be coupled with swab launcher 108. Compressed air (or other fluid) may be fed into swab launcher 108 via inlet 210 in order to compress swab 504 into narrowing portion 202 and then "launch" the swab 504 through tubular neck portion 107 and into liner 110.

Figure 17:
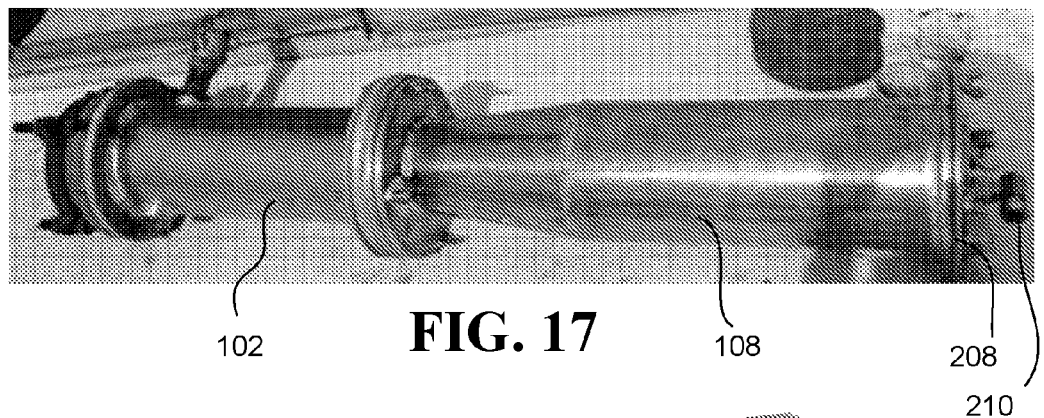
FIG. 17 illustrates a grout injection manifold, swab launcher, and end plate assembly according to embodiments of the present invention.

According to embodiments of the present invention, an air pressure of approximately five to seven pounds per square inch sets swab 504 in motion through swab launcher 108, and an air pressure of approximately two to three pounds per square inch maintains a steady motion of swab 504 through liner 110 from front end 101 to back end 502 after swab 504 has cleared swab launcher 108. According to some embodiments of the present invention, the air pressure supplied through inlet 210 does not exceed ten pounds per square inch. FIG. 17 illustrates a front perspective view of an assembled grout injection manifold 102, swab launcher 108, and end plate 208 with fitting 210, according to embodiments of the present invention.

According to some embodiments of the present invention, the length of straight portion 204/launch chamber 206 is twice the length of narrowing portion 202. According to some embodiments of the present invention, the inner diameter 220 of launch chamber 206 is substantially equal to the diameter of the pipeline 100 being rehabilitated for pipelines 100 of approximately 100 mm in diameter to 300 mm in diameter, while the inner diameter 212 near the front end the swab launcher 108 is approximately twenty-five millimeters less than the corresponding launch chamber 206 diameter 220. According to some embodiments of the present invention, the length of straight portion 204/launch chamber 206 is approximately equal to two and one-half times the diameter of the pipe 100 being rehabilitated.

FIG. 5 illustrates a back end system for halting the progression of swab 504. According to some embodiments of the present invention, swab 504 is permitted to simply exit liner 110 at back end 502; however, in such cases a greater chance of tearing or damaging liner 110 at back end 502 has been observed, because swab 504 may have a tendency to exit and/or expand rapidly upon exiting back end 502 in a manner that may not easily be controlled. However, according to some embodiments of the present invention, a back pressure device 508 may be lodged within liner 110 near back end 502 to halt the advancement of swab 504 within liner 110. Back pressure device 508 may resemble a swab 504, for example, except back pressure device 508 includes an inner tube 510 according to embodiments of the present invention. Inner tube 510 permits air or other fluid displaced by swab 504 to be pushed through inner tube 510 and out of outlet 522. End plate 524 may resemble end plate 208 of FIG. 2, for example.

Figure 20:
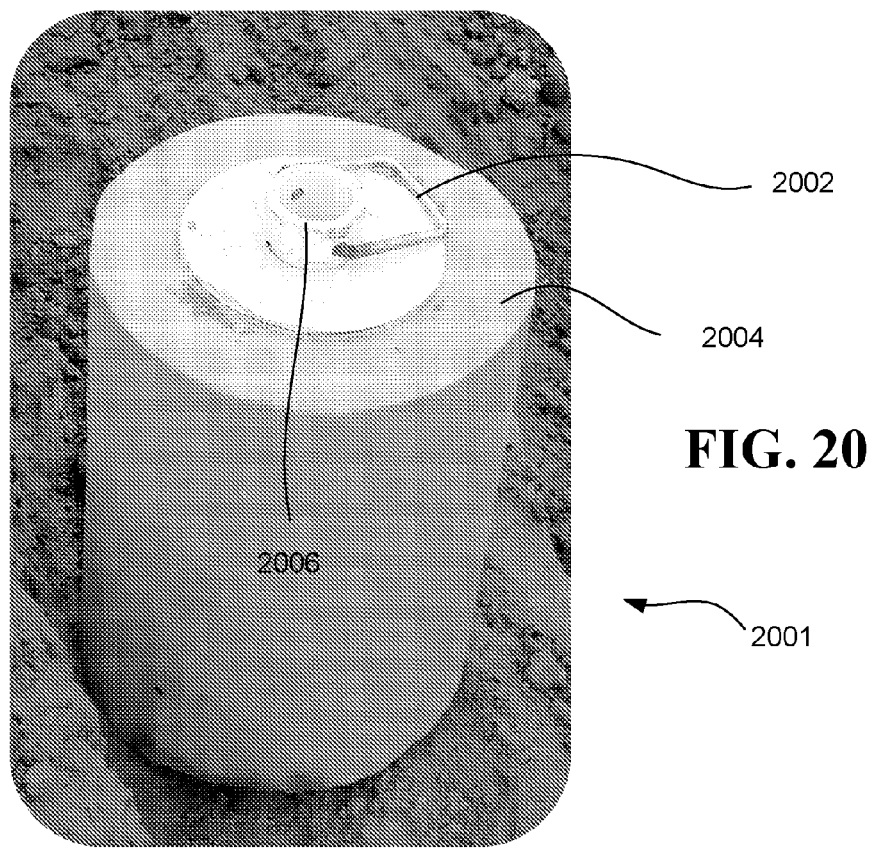
FIG. 20 illustrates a back pressure device, according to embodiments of the present invention.
Figure 21:
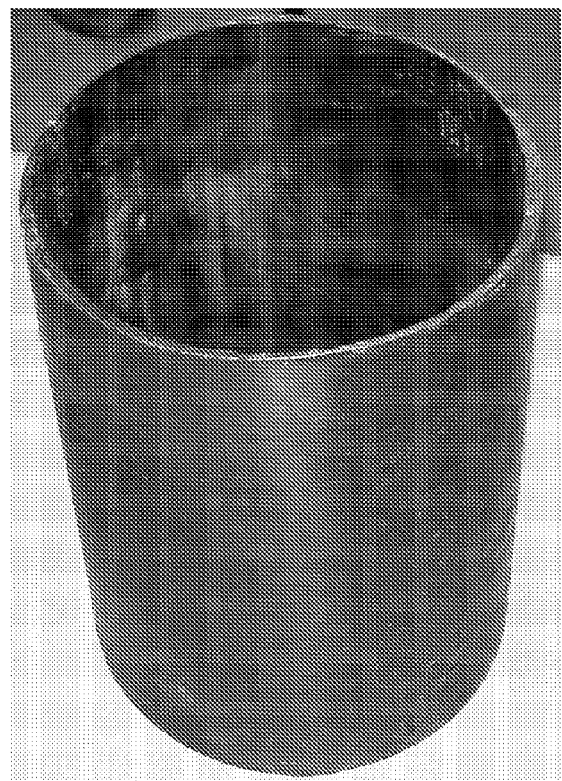
FIG. 21 illustrates an alternative back pressure device, according to embodiments of the present invention.

According to some embodiments of the present invention, back pressure device 508 serves to maintain back pressure between the liner 110 and pipeline 100 to encourage full grout distribution, especially at back end 502. Back pressure device may be made from a soft, two pound density swab through the middle of which runs an equivalent length of two-inch diameter PVC pipe (which may also be referred to as a core hole), for example. FIG. 20 depicts a back pressure device 2001 which includes a foam swab portion 2004, a core hole pipe 2006, and a handle 2002 to facilitate insertion and/or removal of back pressure device 2001 into and/or out of liner clamp 106 at near back end 502, according to embodiments of the present invention. FIG. 21 depicts a plastic sleeve 2102 which may also be used as a back pressure device 2102 for insertion through liner clamp 106 near back end 502, according to embodiments of the present invention.

Figure 24:
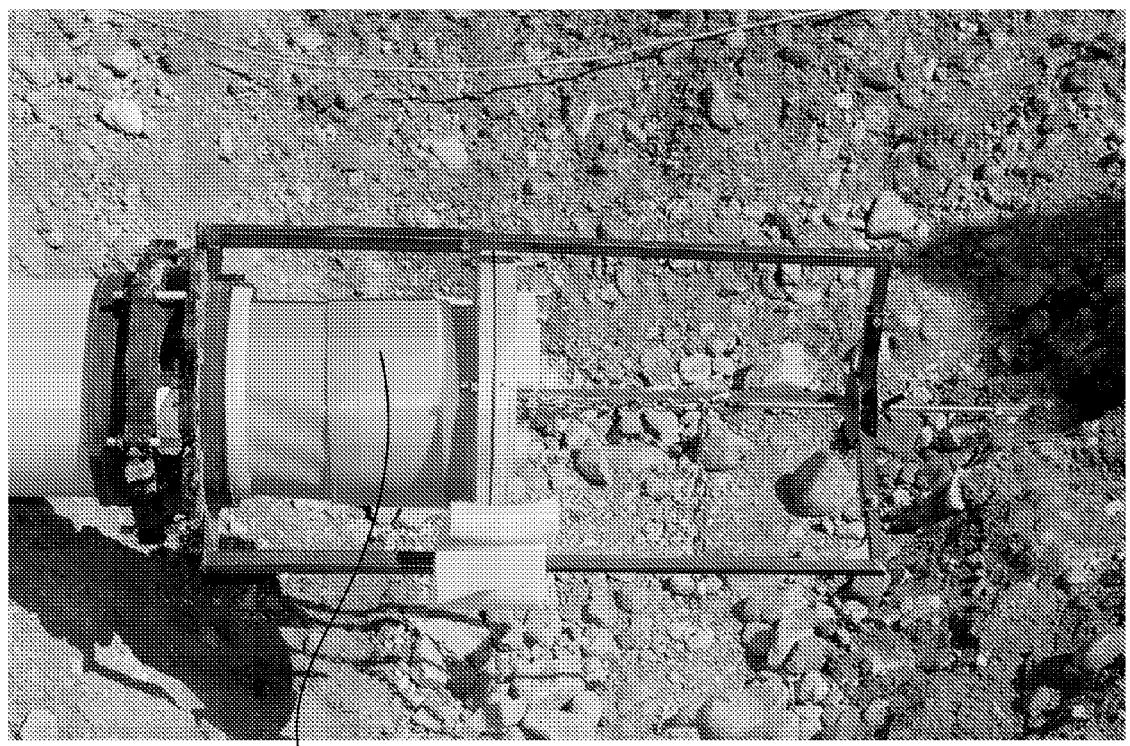
FIG. 24 illustrates a top perspective view of a back end system including a tensioning device, according to embodiments of the present invention.

Once front 516 of swab 504 makes contact with back pressure device 508, swab 504 is halted because the pressure supplied through inlet 210 is no longer enough to overcome the additional friction between an outer diameter of back pressure device 208 and inner diameter 402 of liner 110. Alternatively, back pressure device 508 may make contact with liner clamp 106, end plate 524, or other stopping mechanism near back end 502 which may halt or prevent progression of back pressure device 508 and thus swab 504 according to embodiments of the present invention. According to some embodiments of the present invention, back pressure device 508 includes a handle 2002 which permits a person, upon removal of end plate 524, to reach through liner clamp 106 and/or liner 110, and pull back pressure device 508 out of liner 110. As an additional alternative embodiment, a plastic cylinder 2102 may be used on the inside 402 of liner 110 to halt swab 504. According to some embodiments of the present invention, an outer area 518 of liner 110 between back end 502 and liner clamp 106 may be wrapped with a felt, or a polyethylene-backed or polyester felt, to further reinforce liner 110 at an area 518 which may be more susceptible to tearing during the installation of liner 110. According to some embodiments, such a felt-based liner interfaces well with grout hooks 406 on outer surface 404 of liner 110 in a hook-and-loop type fashion. FIG. 24 depicts a back end system and illustrates how an anti-split sleeve 2402 (e.g. a felt liner) may be wrapped around liner 110 to protect the unsupported liner 110 which extends from back end 502 from damage when the swab 504 emerges from the liner 110, according to embodiments of the present invention.

An indicator stick 512 may also be employed to visually indicate when swab 504 has reached its final position near back end 502, according to embodiments of the present invention. Indicator stick 512 may initially extend through inner tube 510, protruding from back pressure device 508 on one end 514 and resting within outlet 522 on another end 520. As swab 504 nears its end position, front 516 of swab 504 contacts end 514 of indicator stick 512, pushing end 520 of indicator stick 512 out through outlet 522. Once the end 520 of indicator stick 512 is seen protruding from outlet 522, it is known that swab 504 has reached its final position. At such point in time, after swab 504 has traveled the length of pipe 100 and liner 110 has been smoothed against inside 103 of pipe with the grout therebetween, it is desirable to permit the grout to cure while liner 110 is in a pressurized state. In order to minimize pressure loss after swab 504 has reached its final position, indicator stick 512 may be removed and outlet 522 may be capped while the grout cures. According to some embodiments of the present invention, swab 504 and/or back pressure device 508 are left in place during the grout curing phase. According to other embodiments of the present invention, swab 504 includes a transmitter and/or transceiver which permits tracking of the location of the swab 504 from aboveground or from outside of pipe 100 with a paired receiver and/or transceiver. According to other embodiments of the present invention, a foot meter may be used to measure the length of deployment of swab 504 within pipe 100; for example, the cord on the foot meter may be tied or otherwise attached to the swab 504, and the foot meter may measure how far the swab 504 travels, according to embodiments of the present invention.

Figure 6:
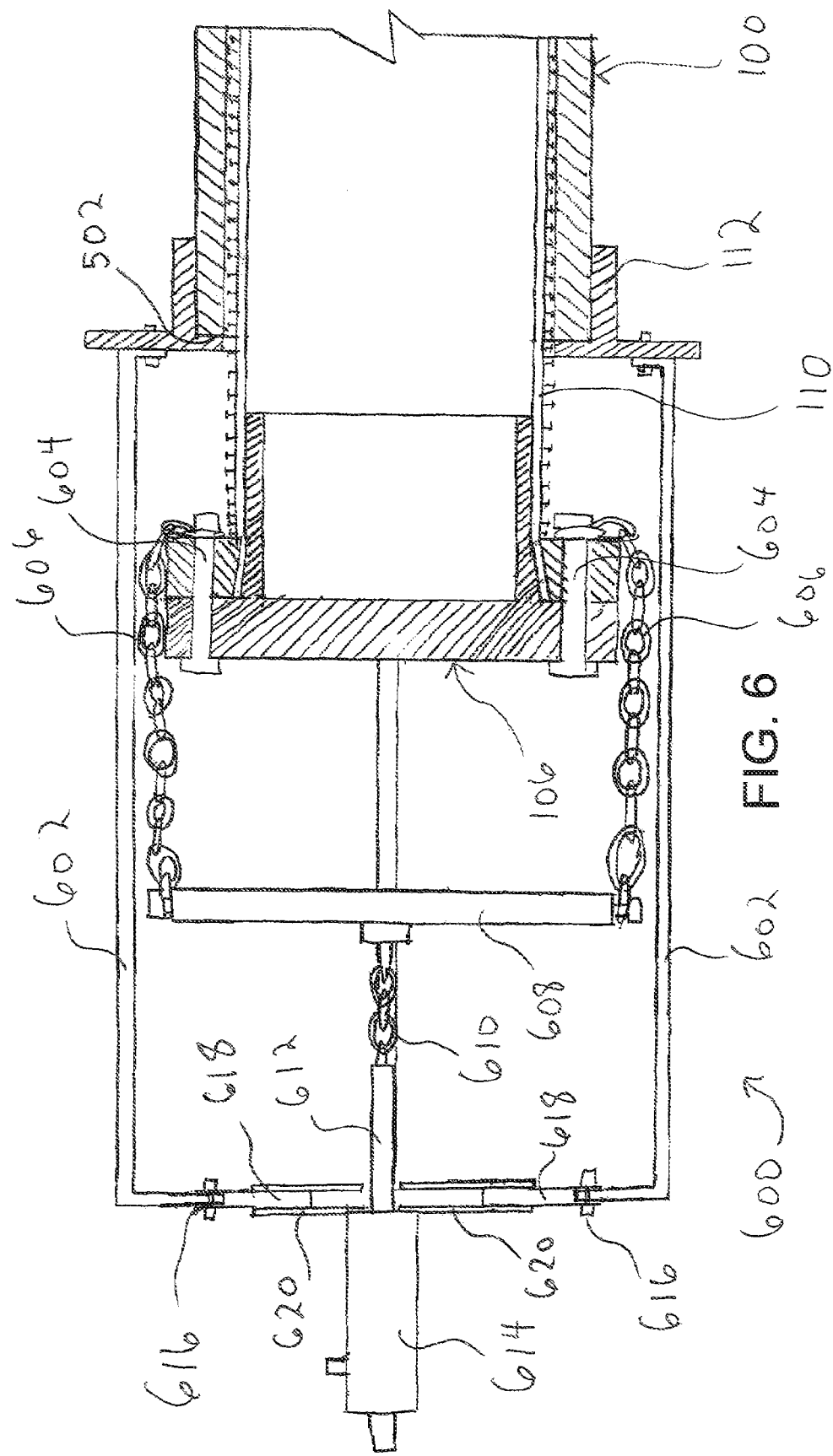
FIG. 6 illustrates a side cross sectional view of a back end system having a liner tensioning device according to embodiments of the present invention.
Figure 7:
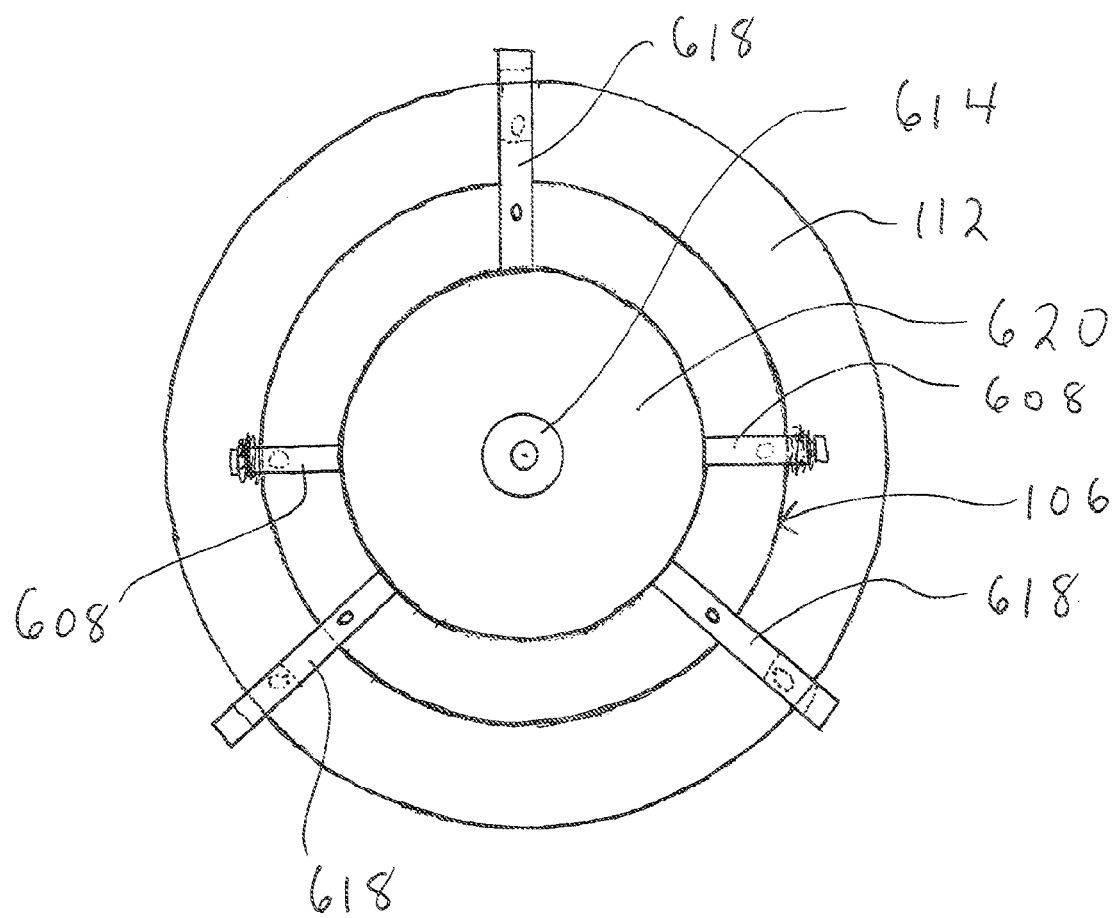
FIG. 7 illustrates a front elevation view of the back end system of FIG. 6, according to embodiments of the present invention.

FIGS. 6 and 7 depict a liner tensioning device 600 used at back end 502 of pipe 100 in order to maintain a tension on liner 110 during grout deployment, and/or grout smoothing/installation. Near front end 101, liner 110 is secured by liner clamp 106 (see FIG. 1), which holds that end of liner clamp 106 in place on grout injection manifold 102 while liner 110 near back end 502 is permitted to move longitudinally with respect to pipe 100. Liner 110 near back end 502 is also secured by another liner clamp 106 (see FIG. 6). According to embodiments of the present invention, liner tensioning device 600 includes a crossbar 608 coupled (via chains 606, for example) with liner clamp 106 and coupled also (via a chain 610, for example) with pneumatic cylinder 612. Pneumatic cylinder 612 is configured to apply a force toward canister 614 upon application of pressurized air to canister 614, thereby pulling crossbar 608, liner clamp 106, and thus liner 110 into tension.

Liner tensioning device 600 not only holds liner 110 in tension with respect to the pipe 100, but it also removes slack in liner 110 which extends from the back end 502. Without such slack removal and tension, liner 110 would be susceptible to being drawn into the pipe 100 and pinned, and travel of the swab 504 would cause the liner 110 to "bunch up" at this point, which may restrict movement of the swab 504 and/or rip or otherwise damage liner 110. Liner tensioning device 600 may also include an anti-twist mechanism; for example, the coupling between chain 610 and crossbar 608 may include a rotating and/or swiveling connection to permit liner 110 to untwist as it is held in tension, according to embodiments of the present invention.

Canister 614 is held in place with respect to pipe 100 via a coupling with plate 620, which is coupled with radial supports 618, which are coupled with longitudinal support 602, which are coupled with an interface flange 112 similar to interface flange 112 of FIG. 1, which is in turn coupled with pipe 100, according to embodiments of the present invention.

According to embodiments of the present invention, longitudinal supports 602 are adjustable in length to accommodate different configurations and lengths of liner 110 and/or other hardware protruding from back end 502. According to yet other embodiments of the present invention, radial supports 618 are adjustable in length to accommodate pipes 100 of different diameters; for example, radial supports 618 may be adjustable at joints 616 by sliding an inner bar into and out of an outer sheath bar. According to alternative embodiments of the present invention, devices other than the canister 614/pneumatic cylinder 612 may be employed to provide the tensioning force; for example, a spring or other spring-like device, or a screw tensioning device such as a wingnut on a threaded bolt setup, may be used to maintain tension on liner 110. FIG. 24 depicts a liner tensioning device having a wingnut on a threaded bolt setup, according to embodiments of the present invention. Based on the disclosure provided herein, one of ordinary skill in the art will recognize the various hardware configurations that may be used to create tension on liner 110 by pulling liner clamp 106 in a direction away from pipe 100.

Once liner 110 has been extended through pipe 100 and attached to liner clamps 106 at both ends, outlet 522 may be capped and/or plugged, and a vacuum may be applied to inlet 210. This vacuum serves to pull the fluid (such as air) out of liner 110, deflating the liner 110. The liner pulls in on itself, forming a V-shape or U-shape cross section within pipe 100. According to some embodiments of the present invention, an air ejector may be connected to inlet 210 of end plate 208 or inlet 522 of end plate 524, and may be used to draw a partial vacuum inside liner 110, causing liner 110 to collapse onto itself to form the desired gutter or trough configuration. The tension on the liner 110 may be released and/or relieved to permit the collapse of liner 110 during deflation, and then re-applied for grouting.

According to some embodiments of the present invention, instead of a cap or plug, a vacuum gauge may be applied to outlet 522 to indicate when the vacuum has reached back end 502 and deflated the full length of liner 110. This step of drawing a vacuum on liner 110 during grout injection has been found to improve grout coverage around the full circumference of liner 110, particularly at the uppermost sections of liner 110. This is because when grout is injected between liner 110 and pipe 100 when liner 110 is not deflated, the grout may tend to fall to the sides and bottom of pipe 100 upon injection, leaving a thinner layer of grout or no grout for the top and uppermost portions of liner 110, according to embodiments of the present invention.

However, when a vacuum is applied to liner 110 during grout injection, the flattened liner 110 tends to assume and/or maintain a V-shape or U-shape, especially when grout is injected over the center of liner 110. Such a cross-sectional V-shape may further by promoted by the way in which the liner 110 is initially deployed into pipe 100; for example, the liner folders of FIGS. 22 and 23 impart a V-shape to liner 110 during deployment of liner 110 into pipe 100. The liner 110 thus creates a trough through which grout may flow into pipe 100, thereby promoting better grout coverage between upper portions of liner 110 and pipe 100. Such a trough further hinders the grout from falling to the sides and bottom of pipe, until swab 504 passes through liner 110, thereby pushing liner 110 against all sides of pipe 100 and evenly distributing the grout. According to some embodiments of the present invention, a vacuum may be applied to the area between liner 110 and pipe 100 to further promote the flow of grout from front end 101 to back end 502. Such a vacuum may be applied, for example, near back end 502 via outlet 522; according to some embodiments of the present invention, such a vacuum between liner 110 and pipe 100 may be applied in addition to or instead of an applied vacuum within liner 110.

Various grouts and/or cementitious mixtures may be employed to bond the liner 110 with the pipe 100, according to embodiments of the present invention. According to some embodiments of the present invention, a grout manufactured by BASF and produced for Mainsaver/Water World Holdings may be used, such grout being a specially formulated cement based grout whose properties include but are not limited to: zero bleed, extended working time under a wide range of temperature conditions, integral anodic corrosion inhibitor, consistency of product formulation and mix, excellent wetting ability and non-absorbency, good contact angle when distributing grout, cohesiveness, non-shrink (there may be an expansion of 0.10% on the dry product, in some cases for example), optimum rheology and surface tension properties, and no surface laitance produced, according to embodiments of the present invention.

According to some embodiments of the present invention, this cement grout is specially formulated for pumpability, working time, corrosion protection, stable volume, absence of bleed, lack of shrinkage, and consistent mix and cured properties. According to some embodiments of the present invention, the grout mortar mix includes one hundred parts cement and twenty-eight parts water. Based on the disclosure provided herein, one of ordinary skill in the art will appreciate the varying cement-to-water ratios that may be used to produce optimum and/or adequate cement grout mixtures, depending on the type of grout used and other factors. The amount of grout to be injected may be approximated by determining the volume between the outer surface 404 of a fully-expanded liner 110 and the inner surface 103 of pipe. Then the result may be multiplied by a safety factor, such as 2.0 or 1.3, because adding too much grout may be less expensive than not adding enough grout and having to redo the installation, according to embodiments of the present invention.

Figure 3:
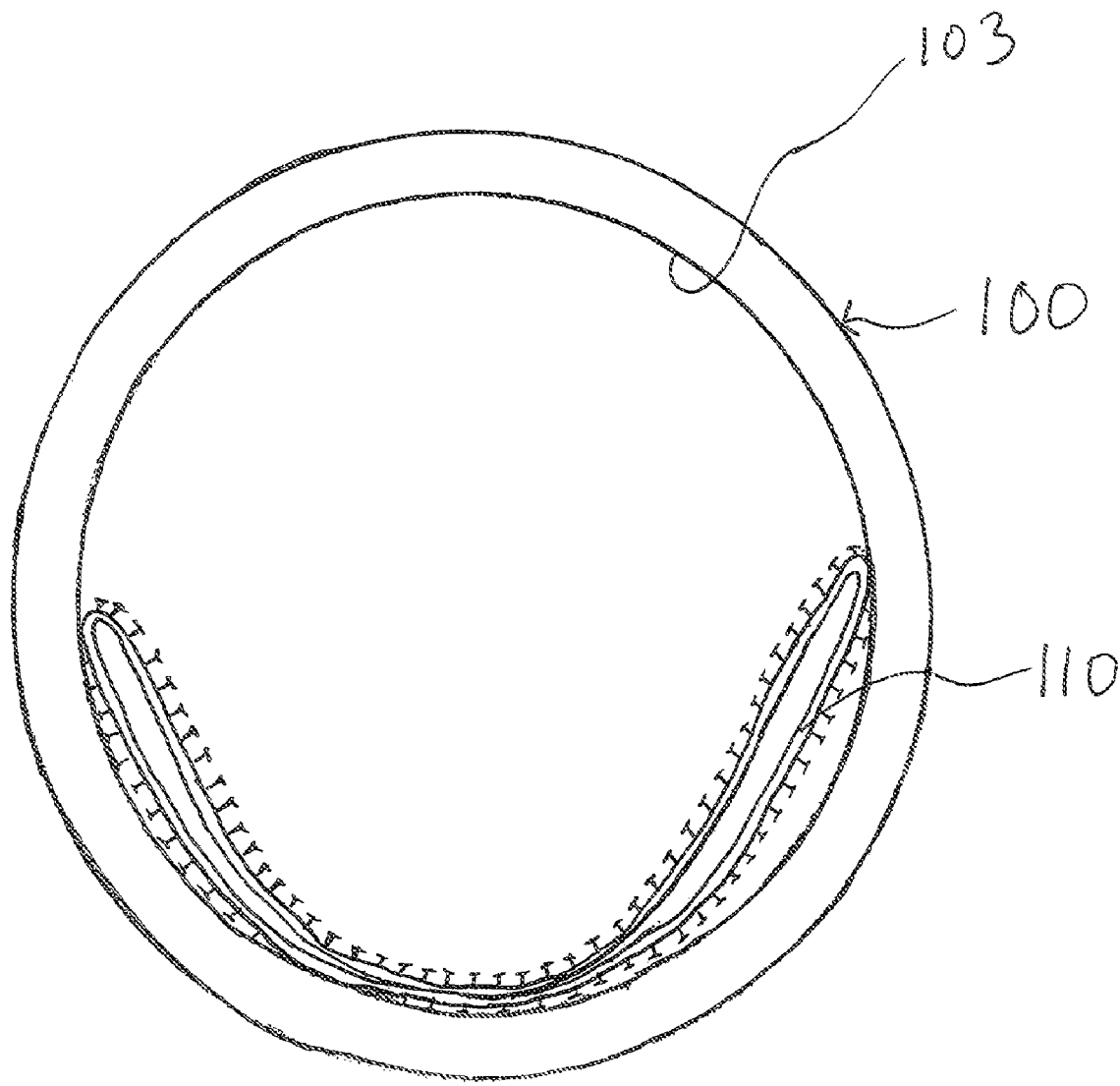
FIG. 3 illustrates a front cross sectional view of a pipe taken along line A-A of FIG. 1, depicting a pipe liner in a deflated state for grout deployment, according to embodiments of the present invention.

Once a vacuum has been applied to inside of liner 110, liner 110 retains a somewhat open configuration as it extends from around tubular neck 107, then sections of liner 110 further from liner clamp 106 taper down and into a V-shape configuration, as depicted in FIG. 1. FIG. 3 depicts liner 110 in a V-shape or U-shape configuration, as a cross section taken along line A-A of FIG. 1. Injecting the grout too close to tubular neck 107 and/or liner clamp 106 may result in the grout flowing around liner 110 and to the sides and bottom of pipe 100. Therefore, a grout injection manifold 102 may be used which is long enough to permit injection of grout through grout injection port 114 over a section of liner 110 which is sufficiently trough-shaped to retain adequate coverage of grout over the top of liner 110 as the grout is deployed into pipe 100. In addition to an overhead grout injection port 114, additional grout injection ports may be used. For example, an additional grout injection port may be formed within grout injection manifold 102 directly below grout injection port 114, in order to inject grout beneath liner 110, according to embodiments of the present invention. According to embodiments of the present invention, approximately seventy percent of the grout is pumped into the trough-shaped portion of liner 110, and approximately thirty percent of the grout is pumped through a grout injection manifold below the liner 110.

Once a sufficient amount of grout has been injected into pipe 100, the vacuum may be removed from inlet 210, and a swab 504 may be placed into launch chamber 206. Next, air pressure may be applied to inlet 210 to push swab 504 through swab launcher 108 and along the length of liner 110 from front end 101 to back end 502, as described above. This will cause liner 110 and the grout around liner 110 to assume the configuration depicted in FIG. 4, a cross section taken along line A-A of FIG. 1 after deployment of swab 504 through liner 110.

According to some embodiments of the present invention, swab 504 may be wrapped tightly by plastic, and the plastic may have holes and/or slits formed therein. FIG. 18 depicts a swab 1802 wrapped in plastic 1806 with slits 1808 and a tail 1804, the tail 1804 formed by twisting the plastic 1806, folding the plastic 1806 back onto itself, and taping it in a loop, according to embodiments of the present invention. Wrapping the swab 1802 in plastic 1806 and forming slits 1808 may permit the "puffing up" of the plastic 1806 surrounding the swab 504, 1802 when fluid pressure is applied to one end of swab 504, 1802 which in turn may permit more effective grout smoothing and/or distribution, and/or better engagement of swab 504, 1802 outer diameter 506 with inside 402 of liner 110.

FIG. 19 depicts a foam swab 1901. Swab 1901 may be flexible and bi-directional, according to embodiments of the present invention. Swab 1901 may be constructed with two pound polyurethane foam (with or without nose), and one end of swab 1901 may be coated with resin to form an impermeable seal, for more effective use of compressed air to transport the swab 1901, according to embodiments of the present invention. Swab has a length 1902 and a diameter 1904 which may vary depending on the diameter of the pipe 100 being rehabilitated. For example, for a rehabilitated pipe of 100 mm diameter, the length 1902 may be 300 mm and the diameter 1904 may be 140 mm; for a rehabilitated pipe of 150 mm diameter, the length 1902 may be 400 mm and the diameter 1904 may be 190 mm; for a rehabilitated pipe of 200 mm diameter, the length 1902 may be 500 mm and the diameter 1904 may be 240 mm; for a rehabilitated pipe of 225 mm diameter, the length 1902 may be 600 mm and the diameter 1904 may be 265 mm; for a rehabilitated pipe of 250 mm diameter, the length 1902 may be 625 mm and the diameter 1904 may be 310 mm; and for a rehabilitated pipe of 300 mm diameter, the length 1902 may be 750 mm and the diameter 1904 may be 325 mm, according to embodiments of the present invention.

According to some embodiments of the present invention, the swab 1802 (FIG. 18) may be formed by starting with an appropriately-sized piece of foam as depicted in FIG. 19, then piercing the foam axially through the center with a piece of rebar. The rebar may be left in place, and a length of 0.5 mm to 1.0 mm linear low density polyethylene ("LLDPE") tube is taped to the rebar and then pulled through the center of swab 1802 with the rebar. The LLDPE tube is then cuffed back to completely cover the swab, and the excess plastic is twisted into a tail 1804, wrapped in tape, and turned back onto itself to form an eyelet, according to embodiments of the present invention. Tail 1804 and the eyelet formed therein may be used for tying or otherwise attaching things to swab 1802; for example, the foot meter line may be tied onto the tail 1804 for monitoring the longitudinal position of swab 1802 within pipe 100.

According to some embodiments of the present invention, multiple swabs 504 may be deployed through liner 110 after deployment of grout through pipe 100. According to such embodiments, the multiple swabs 504 serve to "massage" the grout between the liner 110 and pipe 100, thereby promoting more effective grout coverage and lining. According to some embodiments of the present invention, successive swabs 504 are used with successively increasing and/or decreasing diameters to interact with liner 110 and the associated grout in customized ways.

Figure 15:
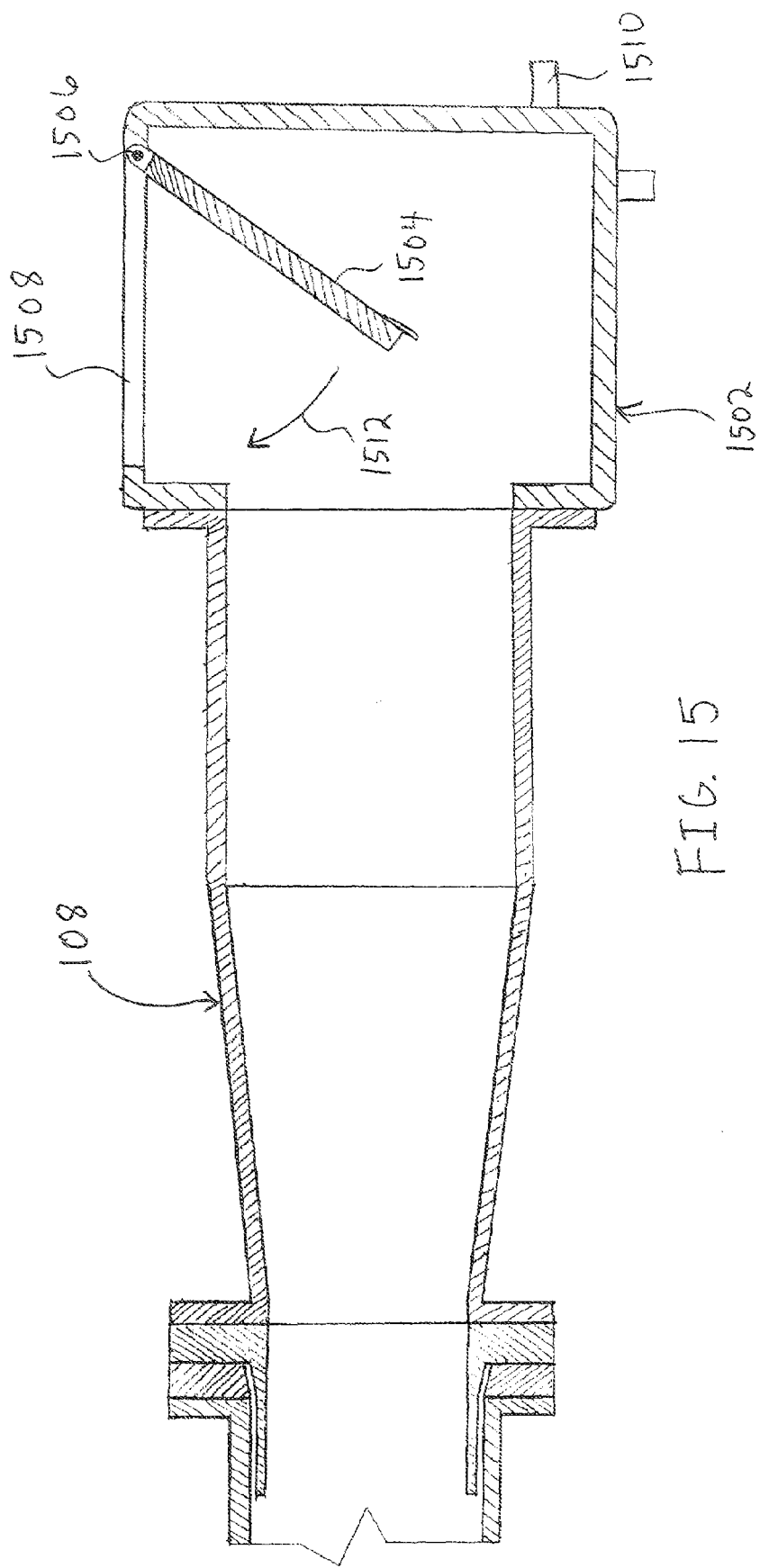
FIG. 15 illustrates a side cross sectional view of a front end system depicting a swab launch box and swab launcher according to embodiments of the present invention.
Figure 26:
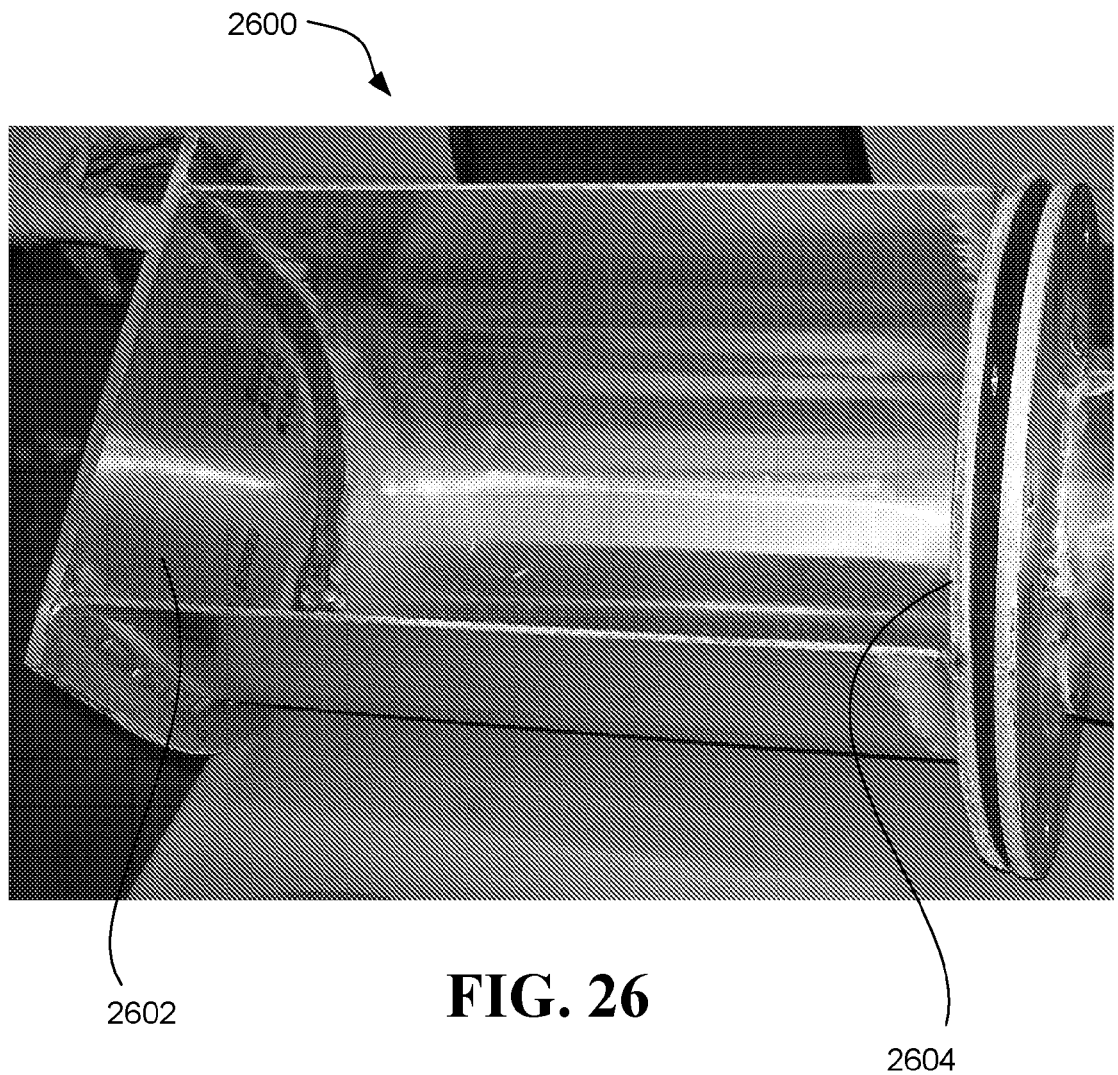
FIG. 26 illustrates a catcher bin according to embodiments of the present invention.

FIGS. 15 and 26 depict additional hardware that may be used to launch multiple successive swabs 504, or to launch the same swab 504 multiple times. For example, the catcher bin 2600 of FIG. 26 may be coupled with liner clamp 106 near back end 502 instead of end plate 524, and may be configured to catch the swab 504 as it is ejected from the end of liner 110 near back end 502. The back plate 2602 stops the swab 504 as it is ejected from the ejection hole 2604 in the front wall of the catcher bin 2600. The launch box 1502 of FIG. 15 may be coupled with swab launcher 108 in lieu of end plate 208. Such a launch box 1502 may permit the swab 504 to be inserted therein through a door 1504 which hinges about hinge point 1506, for example, which closes and/or is held shut by air pressure (or vacuum pressure), such that the door closes easily while maintaining the appropriate pressure inside of the launch box 1502 and thus the swab launcher 108. Such a launch box 1502 may permit fast and easy successive launches of swab 504, for example. Alternatively, the hinged (and optionally hermetically sealable) door 1504 may permit easy insertion of swab 504 through an insertion opening 1508 into the launch box 1502 and thus the swab launcher 108, according to embodiments of the present invention. The door 1504 may be biased in a direction indicated by arrow 1512, such that door 1504 closes itself; for example, such biasing may be achieved by a spring. Launch box 1502 may also include one or more apertures 1510 for inserting compressed air and/or cords for electrical/camera equipment, according to embodiments of the present invention.

Embodiments of the present invention have successfully been used with sections of pipe 100 up to approximately one hundred meters long; however, it is contemplated that longer sections of pipe 100 may be rehabilitated according to embodiments of the present invention. According to such embodiments, an intermediate grout port may be used at intervals along a pipe 100, to inject grout at each interval, in order to help ensure adequate and homogenous grout coverage. Based on the disclosure provided herein, one of ordinary skill in the art will recognize that various intermediate grout injection port intervals may be used depending upon the type of grout used, the diameter and inner surface 103 structure of the pipe 100, the outer surface 104 structure of liner 110, and other factors which determine grout coverage between liner 110 and pipe 100.

Figure 16:
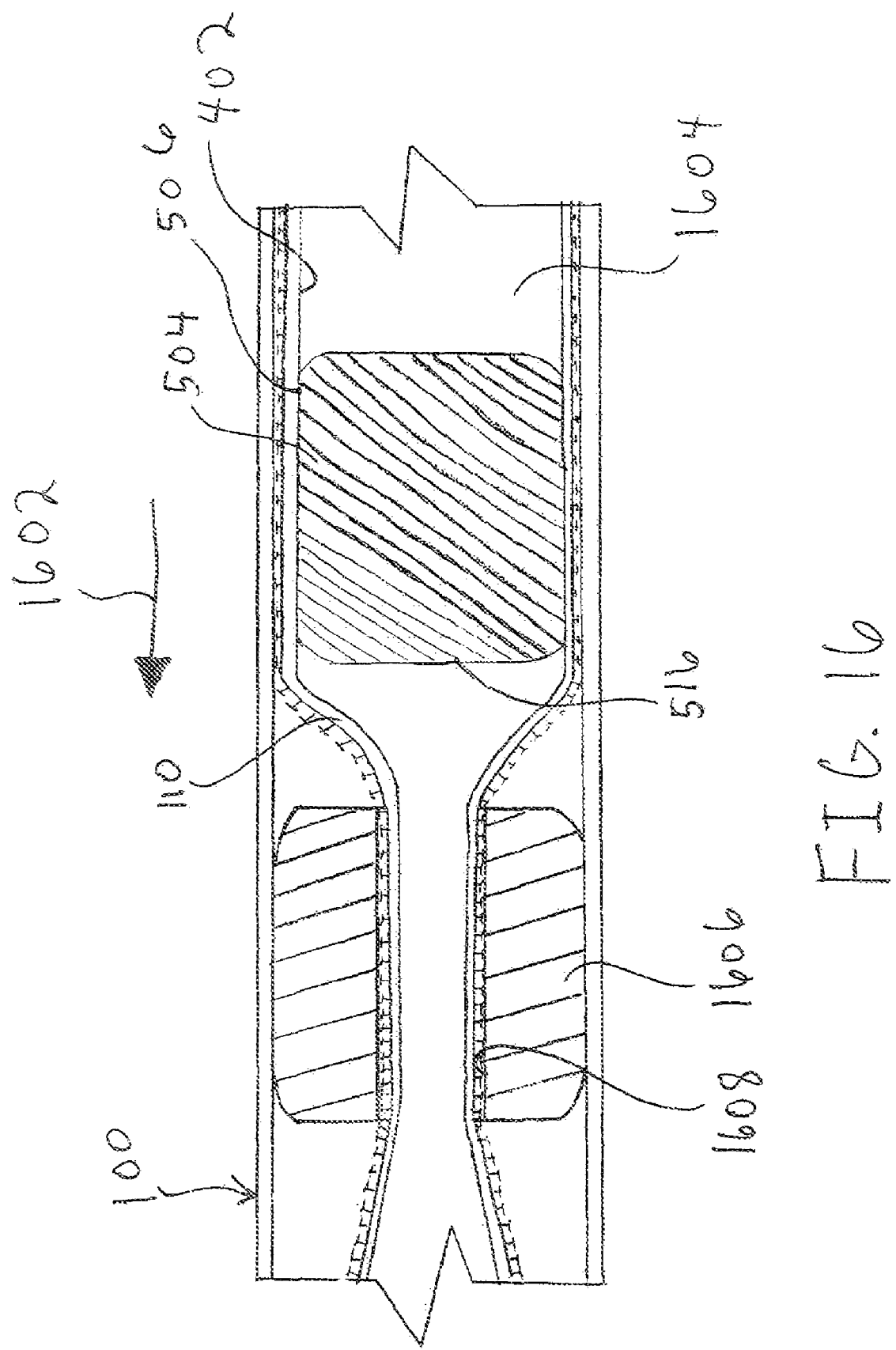
FIG. 16 illustrates a side cross sectional view of a pipeline and liner with a rounding swab and a back pressure swab, according to embodiments of the present invention.

One potential reason for the use of intermediate grout ports may be the maintenance of adequate back pressure to ensure uniform grout distribution and coverage, according to embodiments of the present invention. According to alternative embodiments of the present invention, longer sections of pipe 100 may be grouted and lined by using a back pressure device which is pushed directly in front of swab 504 as swab 504 advances from front end 101 to back end 502. FIG. 16 illustrates an alternative back-pressure device 1606, according to embodiments of the present invention. Back pressure device 1606 is a swab 1606 through which a core hole 1608 is formed. The liner 110 is fed through the core hole 1608. As swab 504 is advanced forward in the direction of arrow 1602 by the application of compressed air into the space 1604 behind swab 504, swab 504 pushes against liner 110 and thus against swab 1606. According to some embodiments of the present invention, grout is present between liner 110 and back pressure swab 1606, such that a distance between back pressure swab 1606 and swab 504 as they advance forward in the pipe 100 may depend on the amount of grout between liner 110 and back pressure swab 1606. Use of back pressure swab 1606 encourages more uniform distribution of grout by maintaining a back pressure within the grout coverage area between liner 110 and pipe 100, and also prevents or hinders the introduction of air into the grout pocket between the liner 110 and pipe 100, according to embodiments of the present invention.

Once the swab 504 has been run through liner 110, it may be desirable to inspect the degree and adequacy of grout coverage between liner 110 and pipe 100. According to some embodiments of the present invention, liner 110 is not transparent, and so using a traditional visual inspection camera would not be effective for detecting unwanted air pockets and/or areas of insufficient grout coverage or gaps between liner 110 and pipe 100. However, due to the fact that undesired grout coverage gaps absorb heat at a different rate than the areas between liner 110 and pipe 100 with full grout coverage, a heat source may be applied to the inside of liner 110, and an infrared camera may be used to detect differences in absorbed heat along the liner 110. Detecting such differences in absorbed heat and/or infrared emissions will identify which areas of liner 110, if any, lack sufficient grout coverage between liner 110 and pipe 100.

According to some embodiments of the present invention, an Aries PE4000 "ThermaView IR" multi-conductor, pan and tilt radial view, color and IR sewer TV camera may be used for liner 110 inspection. According to embodiments of the present invention, the infrared camera used is a thermal imaging system operable to form an image using long wavelength infrared waves emitted by any object with a temperature above absolute zero. Such a passive imaging system requires no external light to form an image. Thermography or remote thermal sensing according to embodiments of the present invention is a non-contact and non-intrusive temperature differential measurement technique; high resolution images containing tens of thousands of different temperature measurements may be rendered to detect even minute temperature differences and thus detect unsatisfactory grout distribution. Although the color visual spectrum camera may not be able to detect defects in grout coverage, it may optionally be used to detect other visually-observable defects, such as tears in the liner 110 or non-conformance of the liner 110 to the inner diameter of pipe 100, for example. In order to create the heat source within liner 110 to permit the inspection with an infrared camera, various methods may be used.

For example, according to some embodiments of the present invention, ambient air may be pumped through liner 110, the ambient air being warmer than liner 110 and pipe 100 and thus conveying heat through liner 110. According to other embodiments of the present invention, a space heater or similar device may be used to heat ambient air at one end of pipe 100 before the air is blown through liner 110. According to yet other embodiments, compressed air may be blown through liner 110; due to its higher pressure, compressed air may also serve to heat liner 110. According to yet other embodiments of the present invention, a heating coil may be deployed through liner 110 to heat liner 110; for example, such a heating coil or heating element may be placed on or near to the infrared camera, described above. According to yet other embodiments of the present invention, a light bulb (another form of heating element) may be used to heat liner 110. After heating of liner 110, the infrared camera may be deployed through liner 110 to detect, in 360 degrees according to some embodiments, any heat differentials which indicate a defect in grout coverage, along with the shape and location of any such defects.

According to some embodiments of the present invention, a heat source may be used which is mounted on or near the infrared camera itself. For example, according to some embodiments of the present invention, a high-intensity light source may be coupled with the back end of the infrared camera. The camera may then be run within the length of pipe 100 to perform a visual inspection using a traditional visual spectrum portion of the camera, while at the same time heating the pipe using the back-mounted high-intensity light source. Such a visual inspection may involve the camera moving through pipe 100 at a speed of approximately one half feet per second, for example. Then, once the camera has run the length of pipe 100, the high-intensity light source may be switched off, and the camera may be backed up through the length of pipe 100, using the infrared portion of the camera to inspect for defects in grout coverage. Performing the heating steps and the infrared detection steps during different runs of the camera through pipe 100 may minimize the chance that the infrared camera picks up heat signals from the high-intensity light itself, rather than from the grout and non-grout areas between liner 110 and pipe 100. Such a procedure also permits the full visual and infrared inspection process to be conducted with a simple "there-and-back" process.

According to some alternative embodiments of the present invention, the camera may be run from one end of the pipe 100 to another with the heat source turned off for an optional visual inspection, then the heat source may be turned on and the infrared camera, which is pointed away from, or in an opposite direction from, the heat source (such as a high-intensity light source), may be used to inspect for grout coverage during the return trip of the camera. According to some embodiments of the present invention, the infrared inspection occurs during the first trip of the camera along the length of the pipe 100 and the visual inspection occurs on the return trip. According to other embodiments of the present invention, a visual inspection and/or an infrared inspection is made during the entire there-and-back trip of the camera along pipe 100, and according to some embodiments, no visual inspection is made with the camera but only an infrared inspection.

According to some embodiments of the present invention, such an inspection of liner 110 may occur immediately after or within a short time after deployment of swab 504 through liner 110, in order to fix any grout defects before curing of the grout. Such a fix may be accomplished by, for example, pumping more grout between liner 110 and pipe 100 and re-deploying swab 504 through liner 110 and/or removing liner 110 and grout and restarting the installation process. According to some embodiments of the present invention, a grout may be used which exhibits exothermic or other heat-related properties which would permit the immediate detection of abnormalities or defects of grout coverage prior to the curing of the grout, and without application of an external heat source. According to other embodiments of the present invention, an ultrasound-based camera may be employed instead of or in addition to an infrared-based camera.

According to some embodiments of the present invention, a heat transfer is created across liner 110 by cooling the inside of liner 110 rather than heating it. This alternative may further take advantage of the grout coverage inspection system of FIGS. 12-14, by permitting the swab 1202 to be deployed from front end 101 to back end 502 to distribute the grout while at the same time propelling the swab 1202 with chilled compressed air to cool the liner 110, while at the same time using the swab 1202 to tow a camera frame 1212 including an infrared camera 1308 to inspect grout coverage during swab 1202 deployment. Such a method of concurrent swab 1202 deployment and grout inspection permits immediate feedback even before the grout has hardened, and permits the installation to be redone and/or repaired if necessary, according to embodiments of the present invention.

Figure 12:
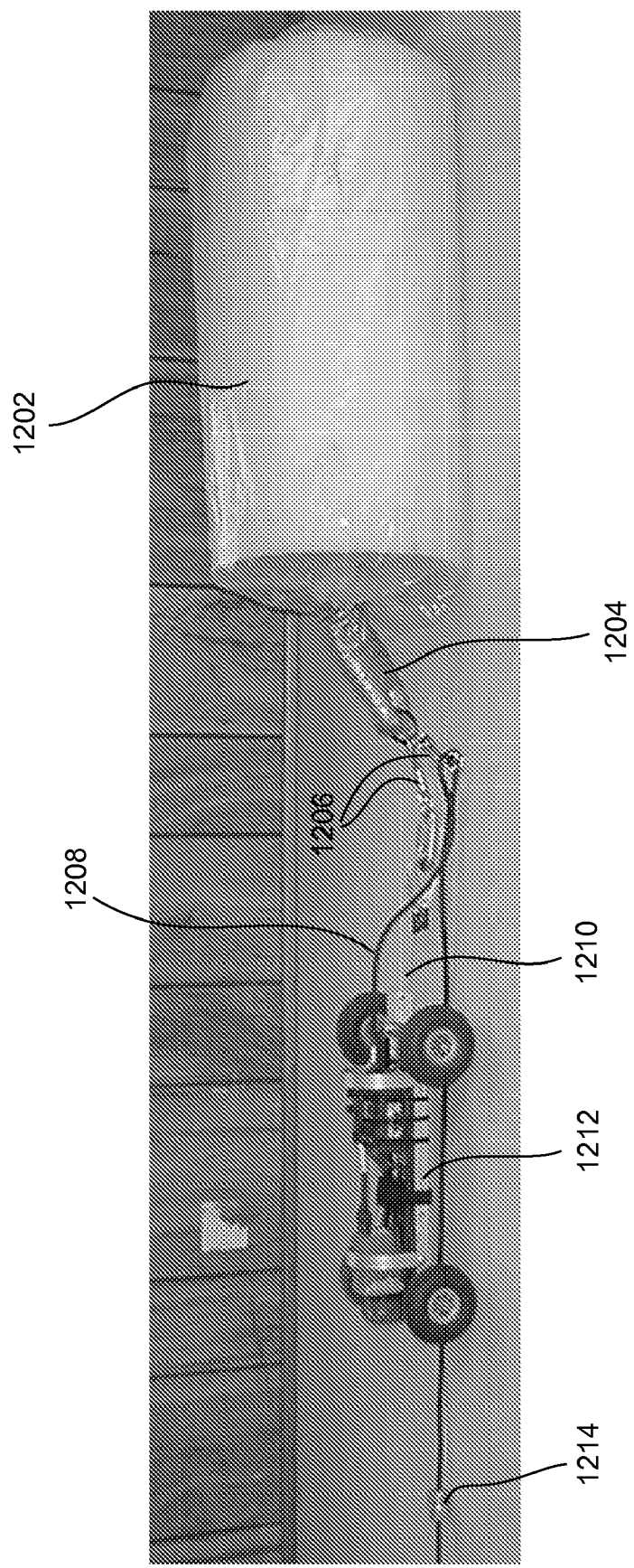
FIG. 12 illustrates a system for grout coverage inspection, according to embodiments of the present invention.
Figure 13:
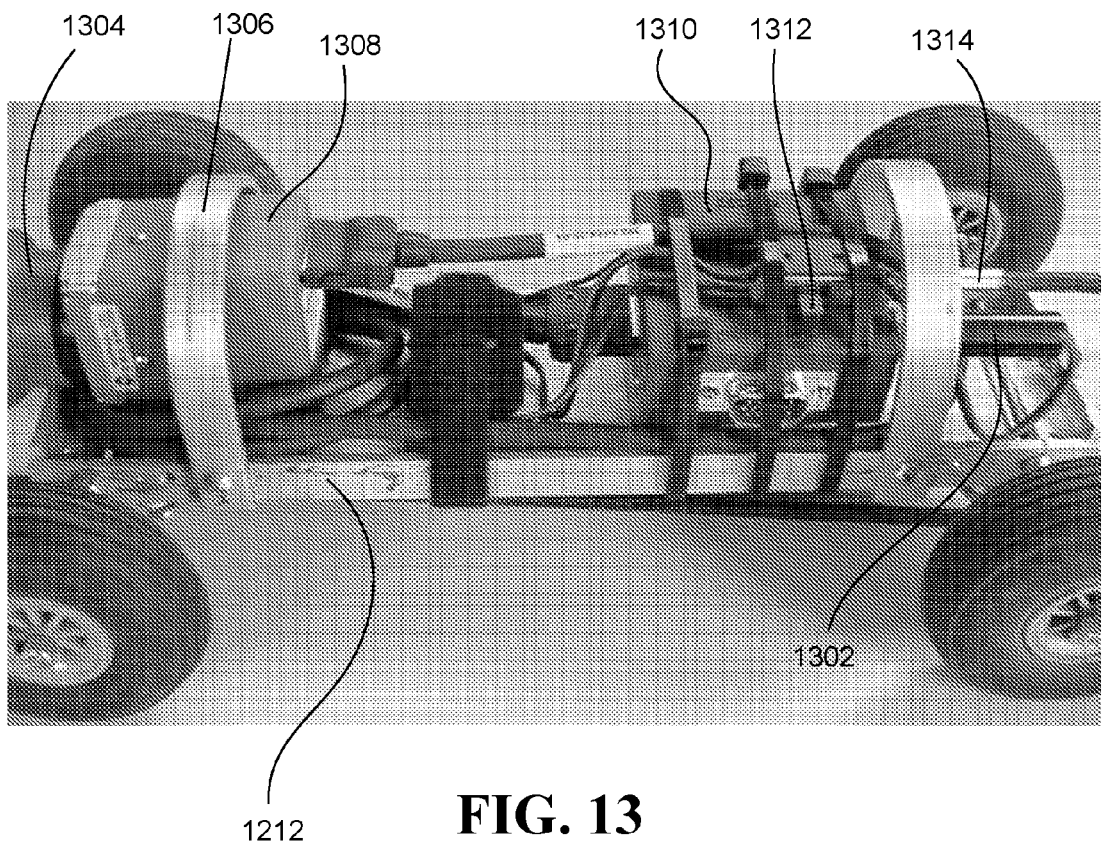
FIG. 13 illustrates a camera frame for a system for grout coverage inspection, according to embodiments of the present invention.
Figure 14:
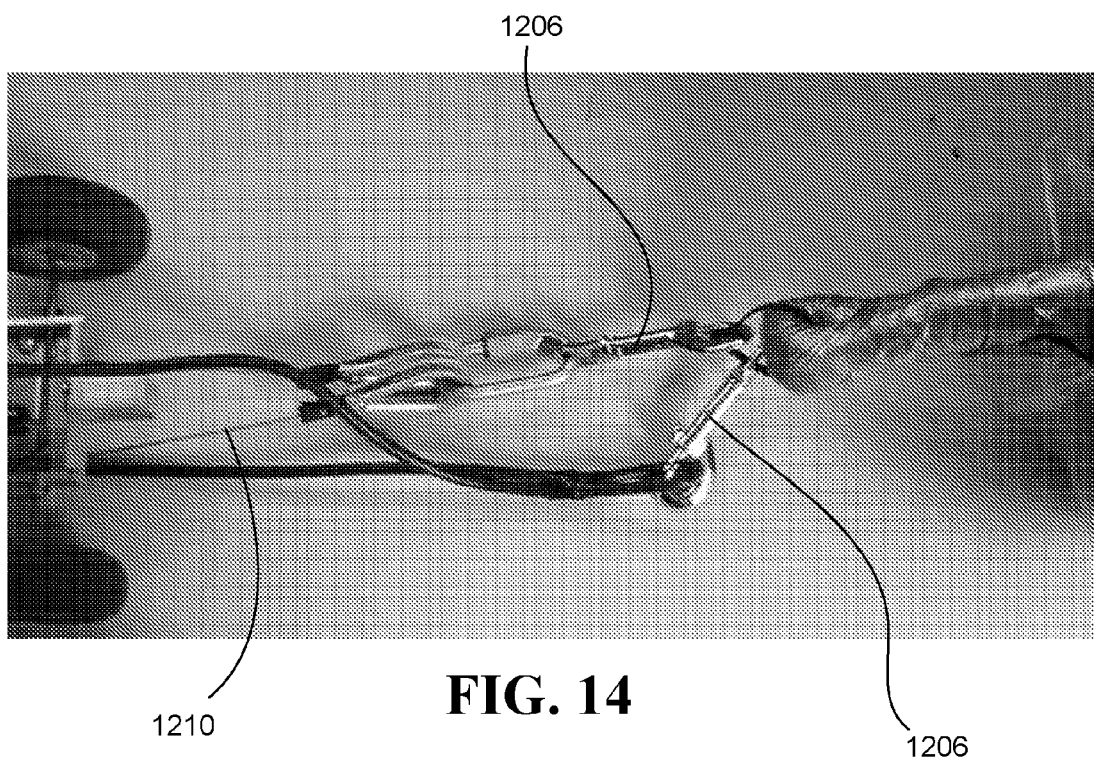
FIG. 14 illustrates a linkage between a swab and a camera frame for a system for grout coverage inspection, according to embodiments of the present invention.

FIGS. 12-14 illustrate a concurrent grout distribution/grout coverage inspection system according to embodiments of the present invention. A swab 1202 is wrapped in plastic and the tail 1204 is attached to a harness 1210 by swivel clips 1206. The harness 1210 and swivel clips 1206 couple the camera frame 1212 (which has two or more wheels) with the swab 1202. A coaxial cable, such as an RG58U coaxial cable, connects to the input/output module 1310 on the camera frame 1212 at coaxial cable connector 1314. A power switch 1312 turns the unit on and off. Also mounted to the camera frame 1212 are infrared camera 1308 having a protective lens cap 1304, as well as one or more protective roll bars 1306 to protect the electronic components should the camera frame 1212 become overturned. Infrared camera 1308 according to embodiments of the present invention may be an infrared camera available from Flir Systems, Inc., for example. Swivel clips 1206 permit the swab 1202 to twist slightly without overturning the camera frame 1212. A power connector 1302 and battery pack (not shown) may also be mounted on the camera frame 1212. A low-loss air fitting 1214 may be affixed to the end plate 208 or other fitting through which the coaxial cable 1208 enters the pressurized zone; low-loss air fitting 1214 permits cable 1208, which connects the electronics of the camera cart 1212 to external monitoring and/or closed-circuit television equipment, to be advanced and retracted without causing significant pressure loss for propulsion of swab 1202, according to embodiments of the present invention. According to some embodiments of the present invention, low-loss air fitting 1214 is a one-half inch brass pipe plug which is through-drilled and chamfered and threadably connected with end plate 208 or other air manifold. According to some embodiments of the present invention, a footage meter line is also attached to camera frame 1212 and/or swab 1202.

The infrared camera transport cart 1212 consists of a rectangular aluminum frame with axles and wheels mounted to it; axle length and wheel diameter can be changed to suit various size pipe 100 diameters. A platform on the frame supports the camera 1308, power supply (e.g. batteries), input/output module 1310, and cables, according to embodiments of the present invention. The tow harness 1210 extends from the frame 1212 to the tail 1204 of the swab 1202; the coaxial cable 1208 may be looped through the tail 1204 and routed back to the cable connection 1314 on the input/output module 1310, according to embodiments of the present invention.

Figure 25:
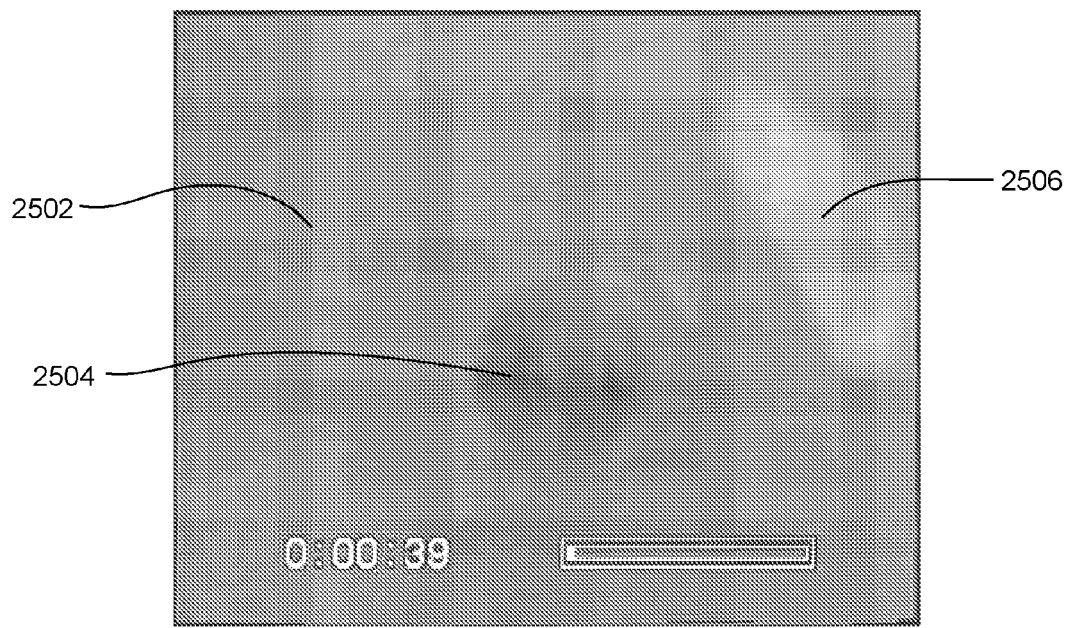
FIG. 25 illustrates an exemplary image from an infrared camera during grout coverage inspection, according to embodiments of the present invention.

According to some embodiments of the present invention, compressed air is routed through a heat exchanger to drop the temperature to twenty-five to thirty degrees below ambient temperature. Chilled air may then be introduced into the liner 110 (e.g. via inlet manifold 210), forcing or otherwise advancing the swab 1202 through the liner 110. As the swab 1202 travels from the front end 101 to toward the back end 502 through the liner 110, it pulls the transport cart 1212 and rear-facing infrared camera 1308. The chilled air cools the thin liner 110 except where liner 110 is in contact with the relatively warmer grout. Where the liner 110 is not in contact with the grout, the infrared camera 1308 can detect the temperature differential between the cool bare liner 110 and the liner 110 which is in contact with the grout, thereby indicating the presence of voids or gaps between the liner 110 and host pipeline 100, according to embodiments of the present invention. FIG. 25 illustrates an exemplary image produced by infrared camera 1308, showing the front opening 2504, the inside 2502 of the liner 110, as well as a spot 2506 of inadequate grout coverage, which shows up in a different shade or color, according to embodiments of the present invention.

According to some embodiments of the present invention, the camera cart 1212 may be releasably coupled with the swab 1202 at the clips 1206 and/or the harness 1210. According to such embodiments, an operator may observe the inside of liner 110 as camera 1308 is transported from front end 101 to back end 502 with swab 1202, then may send a release signal to cause the camera cart 1212 to be released from the swab 1202 to return through liner 110 to perform additional inspections, all without compromising the internal pressurization of liner 110, according to embodiments of the present invention.

According to yet other embodiments of the present invention, a direct attachment of the camera 1308 to the swab 1202 may be achieved by inserting the camera 1308 into the back of the swab 1202 by means of creating a pocket in the swab 1202 or creating an attachable holder. Such a method would eliminate the use of a wheeled cart or skid towed behind the swab 1202, according to embodiments of the present invention. It may also minimize any contact between the camera 1308 and soft grout, thereby deterring formation of unwanted tracks or deformation in the grout prior to cure.

Figure 8:
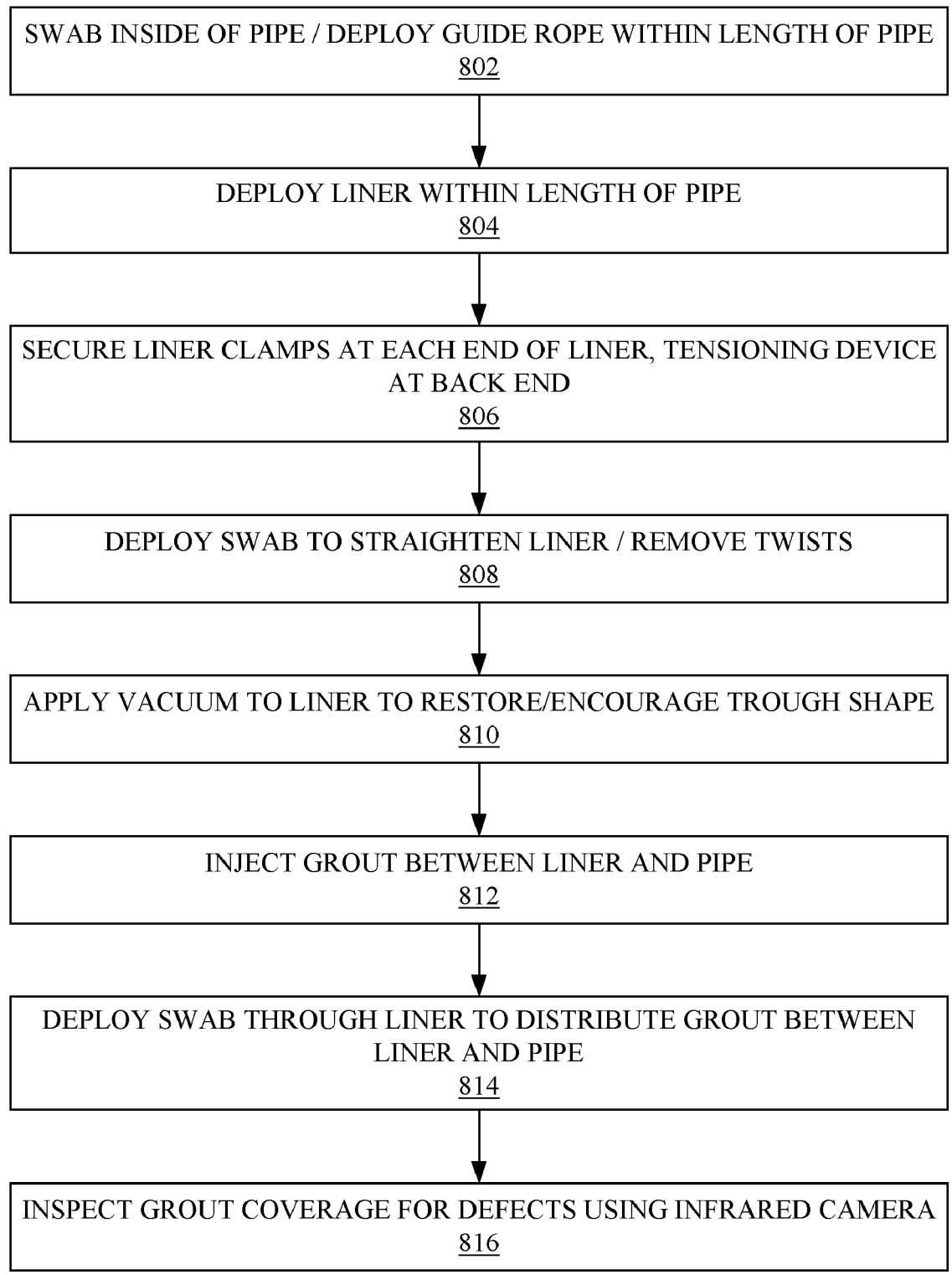
FIG. 8 illustrates a method for rehabilitating a pipeline, such as a water main, according to embodiments of the present invention.

FIG. 8 depicts a flow diagram 800 illustrating a method for pipeline rehabilitation, according to embodiments of the present invention. An inside of the pipe 100 may be swabbed to clean the inside or remove debris, and a guide rope may be deployed within the length of pipe 100 (block 802). Using the guide rope, the liner 110 may be deployed within the length of pipe by, for example, tying the guide rope to one end of the liner 110 and pulling the liner 110 through the pipe 100 (block 804). As liner 110 is deployed within the pipe 100, liner 110 may be folded by a folding device such as, for example, the folding devices depicted in FIGS. 22 and 23. The twisting of liner 110 should be avoided as it travels through pipe 100, and liner 110 should be inspected near back end 502 for any damage. The liner 110 may also be held closed near back end 502 and inflated with compressed air to confirm tube integrity, according to embodiments of the present invention. Liner clamps 106 may be coupled to the liner 110, and a tensioning device 600 installed at the back end 502 (block 806).

A swab 504 may be deployed through the liner 110 by, for example, injecting compressed air behind swab 504, to straighten liner 110 and/or remove any twists (block 808). A vacuum or partial vacuum may be applied to the liner 110 to restore and/or encourage the liner 110 to assume a substantially trough-shaped cross section (block 810). When the liner 110 has assumed a trough-shape, grout may be injected between the liner 110 and the pipe 100 (block 812). The swab 504 may again be deployed through liner 110 from front end 101 toward back end 502 to round the liner 110 and evenly distribute the grout between liner 110 and pipe 100 (block 814). Finally, grout coverage may be inspected for defects using an infrared camera as described above, either before or after the grout hardens (block 816). Air pressure may be maintained within the liner 110 until the cement hydrates, which, according to some embodiments of the present invention, occurs after approximately sixteen hours. Once the cement mortar (e.g. grout) has hardened, the liner 110 becomes self-supporting, according to embodiments of the present invention.

Figure 9:
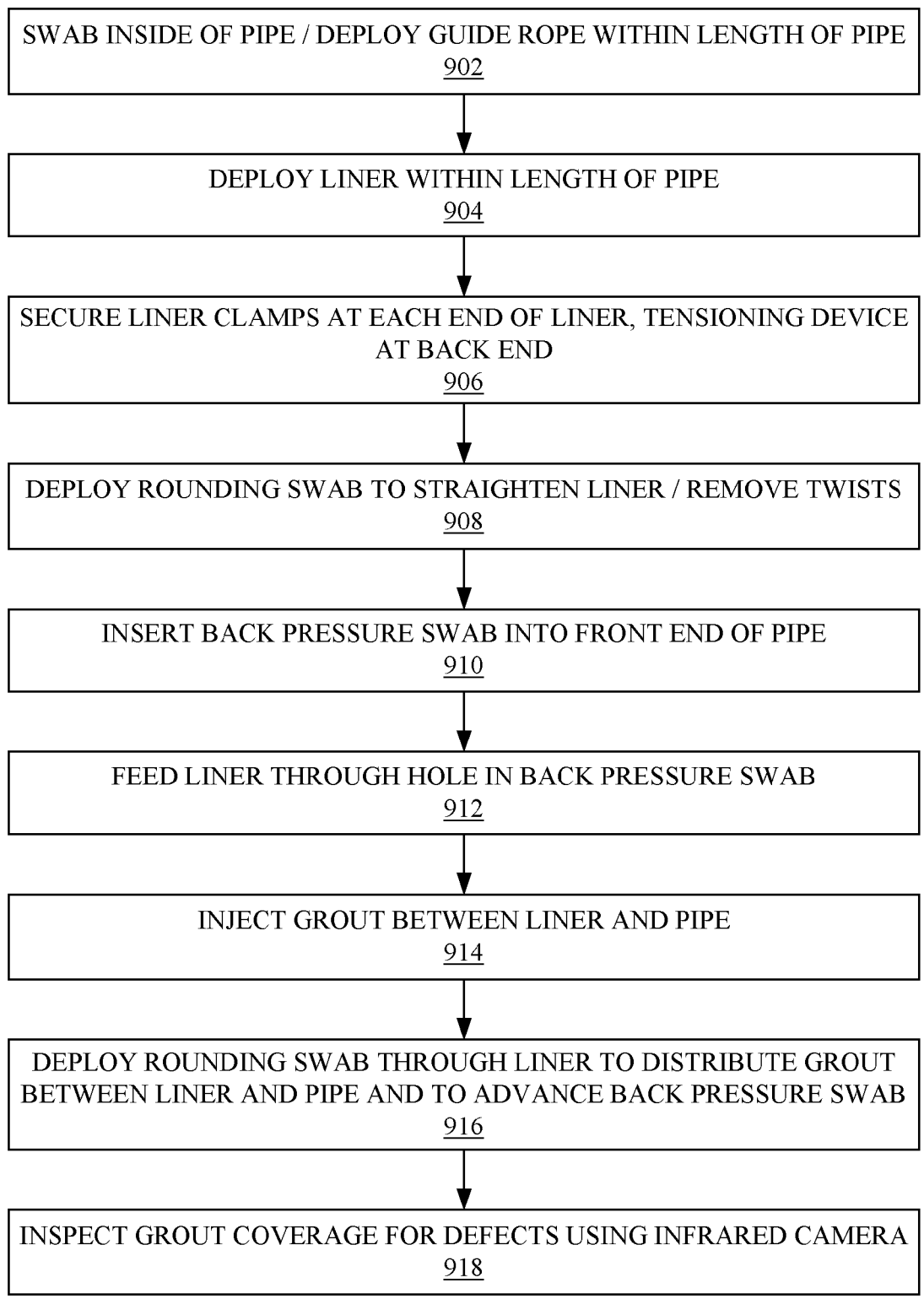
FIG. 9 illustrates another method for rehabilitating a pipeline, such as a water main, according to embodiments of the present invention.

FIG. 9 depicts a flow diagram 900 illustrating another method for pipeline rehabilitation, according to embodiments of the present invention. An inside of the pipe 100 may be swabbed to clean the inside or remove debris, and a guide rope may be deployed within the length of pipe 100 (block 9802). Using the guide rope, the liner 110 may be deployed within the length of pipe by, for example, tying the guide rope to one end of the liner 110 and pulling the liner 110 through the pipe 100 (block 904). As liner 110 is deployed within the pipe 100, liner 110 may be folded by a folding device such as, for example, the folding devices depicted in FIGS. 22 and 23. Liner clamps 106 may be coupled to the liner 110, and a tensioning device 600 installed at the back end 502 (block 906).

A swab 504 may be deployed through the liner 110 by, for example, injecting compressed air behind swab 504, to straighten liner 110 and/or remove any twists (block 908). A back pressure swab 1606 may be inserted into the front end 101 of the pipe 100 (block 910), and the liner 110 may be fed or otherwise placed through hole 1608 in back pressure swab 1606 (block 912), according to embodiments of the present invention. Optionally, a vacuum or partial vacuum may be applied to the liner 110 to restore and/or encourage the liner 110 to assume a substantially trough-shaped cross section. Grout may be injected between the liner 110 and the pipe 100 (block 914). The swab 504 may again be deployed through liner 110 from front end 101 toward back end 502 to round the liner 110 and evenly distribute the grout between liner 110 and pipe 100, and also to advance the back pressure swab 1606 ahead of swab 504 to maintain back pressure between liner 110 and pipe 100 to ensure more even grout coverage (block 916). Finally, grout coverage may be inspected for defects using an infrared camera as described above, either before or after the grout hardens (block 918).

Figure 10:
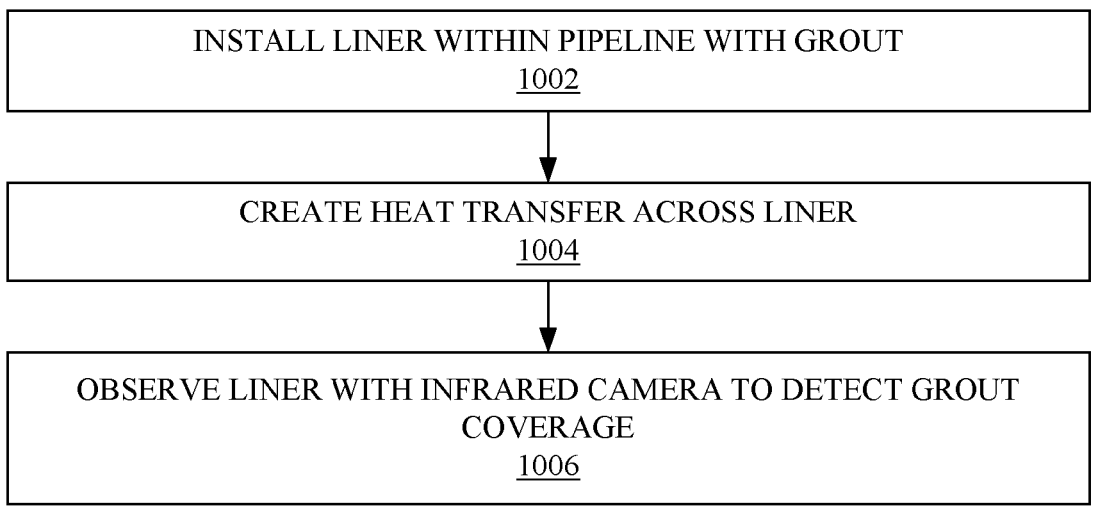
FIG. 10 illustrates a method for grout coverage inspection, according to embodiments of the present invention.

FIG. 10 depicts a flow chart 1000 illustrating a method for pipeline installation grout coverage inspection, according to embodiments of the present invention. A liner 110 is installed within a pipeline 100 with grout between the liner 110 and pipeline 100 (block 1002). A heat transfer is created across the liner (block 1004), which, as described above, may be accomplished by heating or cooling the inside of the liner 110, according to embodiments of the present invention. The liner 110 may be observed from the inside with an infrared camera 1308 to detect grout coverage by detecting a temperature differential between the areas of liner 110 in contact with the grout and the areas of liner 110 not in contact with the grout (block 1006), because the heat transfer across the liner 110 occurs differently for areas of liner 110 in contact with the grout and areas of liner 110 not in contact with the grout, according to embodiments of the present invention.

Figure 11:
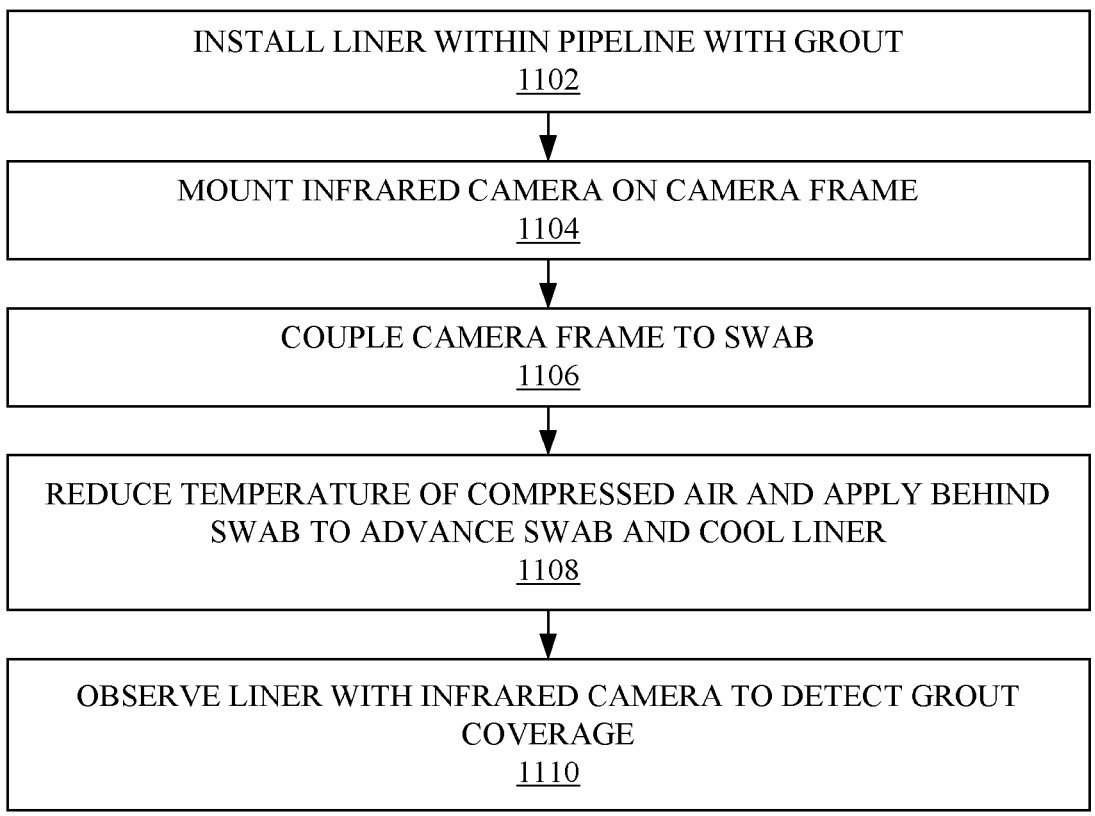
FIG. 11 illustrates another method for grout coverage inspection, according to embodiments of the present invention.

FIG. 11 depicts a flow chart 1100 illustrating a method for simultaneous swab 1202 advancement/grout smoothing and grout coverage inspection, according to embodiments of the present invention. A liner 110 is installed within a pipeline 100 with grout between the liner 110 and pipeline 100 (block 1102). An infrared camera 1308 is mounted on a camera frame 1212 (block 1104), and the camera frame 1212 is coupled to a swab 1202 (block 1106). Compressed air is chilled and the chilled compressed air is injected into liner 110 behind swab 1202 to simultaneously advance the swab 1202 through liner 110 and cool the liner 110 (block 1108). As the swab 1202 pulls the infrared camera 1308 through liner 110, camera 1308 observes liner 110 from the inside to detect grout coverage by detecting a temperature differential between the areas of liner 110 in contact with the grout and the areas of liner 110 not in contact with the grout (block 1110), according to embodiments of the present invention. Based on the disclosure provided herein, one of ordinary skill in the art will recognize that various steps may be performed in different orders, and that less than or more than all of the described steps may be used in a particular method, according to embodiments of the present invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method for pipeline rehabilitation grout coverage inspection, the method comprising:
    installing a tubular liner within a pipeline by filling a space between the tubular liner and the pipeline with grout, wherein the tubular liner and the pipeline each have a front end and a back end;
    creating a heat transfer across the tubular liner by cooling an inside of the tubular liner;
    observing the inside of the tubular liner with an infrared camera to detect an infrared signal differential between areas of the tubular liner in contact with the grout and areas of the tubular liner not in contact with the grout;
    mounting the infrared camera on a camera frame with two or more wheels;
    coupling the camera frame with a swab;
    advancing the swab through the tubular liner from the front end to the back end of the tubular liner to distribute the grout between the tubular liner and the pipeline; and
    observing the inside of the tubular liner with the infrared camera during advancing of the swab.

2. The method of claim 1, wherein advancing the swab through the tubular liner from the front end to the back end of the tubular liner comprises applying compressed air into the tubular liner behind the swab.

3. The method of claim 2, wherein cooling the inside of the tubular liner comprises routing the compressed air through a heat exchanger to reduce a temperature of the compressed air.

4. The method of claim 3, wherein the temperature is twenty-five to thirty degrees Fahrenheit below an ambient air temperature.

5. The method of claim 1, wherein observing the inside of the tubular liner with the infrared camera comprises observing the inside of the tubular liner with the infrared camera before the grout hardens.

6. A system for pipeline rehabilitation installation inspection, the system comprising:
    a tubular liner deployed along an inside of a pipeline;
    a swab configured to advance through the tubular liner to open the tubular liner and distribute grout between the tubular liner and the pipeline;
    a means for creating a heat transfer across the tubular liner; and
    an infrared camera coupled to the swab, the infrared camera configured to detect gaps in grout coverage by detecting an infrared signal differential between areas of the tubular liner in contact with the grout and areas of the tubular liner not in contact with the grout.

7. The system of claim 6, further comprising:
    a camera frame with two or more wheels, the infrared camera mounted to the camera frame, the infrared camera coupled to the swab by a coupling between the camera frame and the swab.

8. The system of claim 7, wherein the camera frame is removably coupled to the swab, and wherein the camera frame is operable to detach from the swab and propel itself within the tubular liner.

9. A method for pipeline rehabilitation grout coverage inspection, the method comprising:

installing a tubular liner within a pipeline and inserting grout between the tubular liner and the pipeline;

mounting an infrared camera on a camera frame with two or more wheels;

coupling the camera frame to a swab;

routing compressed air through a heat exchanger to reduce a temperature of the compressed air;

applying the compressed air into the tubular liner behind the swab to advance the swab and the camera frame through the tubular liner and to cool the tubular liner; and observing an inside of the tubular liner with the infrared camera to detect an infrared signal differential between areas of the tubular liner in contact with the grout and areas of the tubular liner not in contact with the grout.

10. The method of claim 9, wherein coupling the camera frame to the swab comprises swivelably coupling the camera frame to the swab, such that a rotation of the swab as the swab advances through the tubular liner does not overturn the camera frame.

11. The method of claim 9, wherein observing the inside of the tubular liner with the infrared camera occurs prior to hardening of the grout.

12. The method of claim 11, further comprising:

uninstalling the tubular liner based on the detection of areas of the tubular liner not in contact with the grout.

* * * * *